United States Patent
Zhang et al.

(10) Patent No.: US 11,277,176 B2
(45) Date of Patent: Mar. 15, 2022

(54) COMMUNICATION METHOD, COMMUNICATIONS APPARATUS, AND COMMUNICATIONS SYSTEM

(71) Applicant: HUAWEI TECHNOLOGIES CO., LTD., Guangdong (CN)

(72) Inventors: Ruiqi Zhang, Beijing (CN); Xiang Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/039,475

(22) Filed: Sep. 30, 2020

(65) Prior Publication Data

US 2021/0021309 A1   Jan. 21, 2021

Related U.S. Application Data

(63) Continuation of application No. PCT/CN2018/082008, filed on Apr. 4, 2018.

(51) Int. Cl.
*H04B 7/0456* (2017.01)
*H04L 27/26* (2006.01)

(52) U.S. Cl.
CPC ....... *H04B 7/0456* (2013.01); *H04L 27/2613* (2013.01)

(58) Field of Classification Search
CPC ... H04B 1/52; H04B 7/06; H04B 7/14; H04B 7/024; H04B 7/373; H04B 7/0456;
(Continued)

(56) References Cited

U.S. PATENT DOCUMENTS

| | | | | |
|---|---|---|---|---|
| 2014/0126436 A1* | 5/2014 | Safavi | ............... | H04W 52/242 370/295 |
| 2018/0115357 A1* | 4/2018 | Park | ................. | H04B 7/06 |
| 2018/0262250 A1* | 9/2018 | Kim | ................. | H04B 7/063 |

FOREIGN PATENT DOCUMENTS

| | | | |
|---|---|---|---|
| CN | 101645722 A | 2/2010 | |
| CN | 102255705 A | 11/2011 | |

(Continued)

OTHER PUBLICATIONS

Catt, "Discussion on remaining details of codebook based UL transmission," 3GPP RSG RAN WG1 Meeting 91, R1-1720178, Reno, USA, Oct. 9-13, 2017, 14 pages.

(Continued)

*Primary Examiner* — Shawkat M Ali
(74) *Attorney, Agent, or Firm* — Fish & Richardson P.C.

(57) ABSTRACT

This application provides an example communication method and apparatus. The communication method is performed in a communications system, where N antenna ports are configured for the terminal device, N is an integer greater than or equal to 2, the N antenna ports correspond to T antenna port combination modes, each antenna port combination mode corresponds to M antenna ports in the N antenna ports, and each antenna port combination mode set includes at least one antenna port combination mode. The communication method includes receiving, by the network device, first indication information from the terminal device, where the first indication information is used to indicate a first antenna port combination mode set. The method also includes determining, by the network device, K antenna ports in the N antenna ports based on the first antenna port combination mode set and sending, by the network device, second indication information to the terminal device.

20 Claims, 10 Drawing Sheets

(58) Field of Classification Search
CPC ....... H04B 7/0636; H04B 17/309; H04L 1/00; H04L 1/02; H04L 5/00; H04L 7/00; H04L 12/26; H04L 25/02; H04L 27/06; H04L 27/2613; H04W 4/00; H04W 16/28; H04W 24/00; H04W 24/10; H04W 72/04; H04W 72/08
USPC ........ 370/246, 295, 315, 328, 329; 375/219, 375/260, 267, 295, 316
See application file for complete search history.

(56) References Cited

FOREIGN PATENT DOCUMENTS

| CN | 107302796 A | 10/2017 |
|---|---|---|
| CN | 107733498 A | 2/2018 |
| WO | 2014161145 A1 | 10/2014 |
| WO | 2017124967 A1 | 7/2017 |

OTHER PUBLICATIONS

Catt, "Further discussion on codebook based transmission for UL," 3GPP TSG RAN WG1 Meeting 90bis, R1-1717807, Prague, CZ, Oct. 9-13, 2017, 5 pages.

Extended European Search Report issued in European Application No. 18913801.9 dated Apr. 15, 2021, 10 pages.

Qualcomm Incorporated, "SRS antenna switching for 1T4R and 2T4R," 3GPP TSG RAN WG1 Meeting #92, R1-1802983, Athens, Greece, Feb. 26-Mar. 2, 2018, 8 pages.

PCT International Search Report and Written Opinion issued in International Application No. PCT/CN2018/082008 dated Dec. 29, 2018, 15 pages (with English translation).

Office Action in Chinese Application No. 201880091575.5, dated Jun. 23, 2021, 16 pages (with English translation).

* cited by examiner

-- PRIOR ART --

COMMUNICATION METHOD, COMMUNICATIONS APPARATUS, AND COMMUNICATIONS SYSTEM

CROSS-REFERENCE TO RELATED APPLICATIONS

This application is a continuation of International Application No. PCT/CN2018/082008, filed on Apr. 4, 2018, the disclosure of which is hereby incorporated by reference in its entirety.

TECHNICAL FIELD

This application relates to the wireless communications field, and more specifically, to a communication method, a communications apparatus, and a communications system.

BACKGROUND

A multiple-input multiple-output (MIMO) technology is widely used in a long term evolution (LTE) system. In an existing LTE protocol, a network device may have 32 transmit antenna ports, while a terminal device may have four receive antenna ports. However, to support the sending of uplink data, the terminal device needs to connect a power amplifier (PA) to a corresponding antenna port. For example, to support parallel data transmission over X transmit antenna ports, the terminal device usually needs X power amplifiers. In other words, one power amplifier is matched for each transmit antenna port. Because construction costs of the power amplifier are relatively high, a terminal having a capability of four transmit antenna ports is not quite common.

In the prior art, one or two PAs are configured for the terminal device. A connection between the PA and the antenna port of the terminal device may be dynamically changed, and the terminal device is capable of dynamically adjusting an antenna port for sending an uplink signal. Therefore, how to dynamically select the antenna port from a plurality of antenna ports of the terminal device to transmit the uplink signal becomes a technical problem to be urgently resolved.

SUMMARY

This application provides a communication method, a communications apparatus, and a communications system, so that an antenna port can be dynamically selected from a plurality of antenna ports of a terminal device to transmit an uplink signal.

According to a first aspect, a communication method is provided. The communication method is performed in a communications system including a network device and a terminal device, where N antenna ports are configured for the terminal device, N is an integer greater than or equal to 2, the N antenna ports correspond to T antenna port combination modes, each antenna port combination mode corresponds to M antenna ports in the N antenna ports, at least one of M antenna ports corresponding to any two antenna port combination modes is different, each antenna port combination mode set includes at least one antenna port combination mode, and T is an integer greater than or equal to 1. The communication method includes: receiving, by the network device, first indication information from the terminal device, where the first indication information is used to indicate a first antenna port combination mode set; determining, by the network device, K antenna ports in the N antenna ports based on the first antenna port combination mode set, where K is an integer greater than or equal to 1, and less than or equal to M; and sending, by the network device, second indication information to the terminal device, where the second indication information is used to indicate the K antenna ports.

According to the communication method in this embodiment of this application, the first indication information is received from the terminal device, and the K antenna ports are determined in the N antenna ports configured for the terminal device. In addition, the second indication information is sent to the terminal device to indicate the K antenna ports. Because the first indication information already indicates the first antenna port combination mode set, the network device determines the K antenna ports in the N antenna ports based on the first antenna port combination mode set. According to the communication method in this embodiment of this application, an antenna port can be dynamically selected from a plurality of antenna ports of the terminal device to transmit an uplink signal, so that the uplink signal can be sent on K optimal antennas, thereby improving uplink performance.

With reference to the first aspect, in some implementations of the first aspect, the first antenna port combination mode set includes S antenna port combination modes, and S is an integer greater than or equal to 1, and less than or equal to T; and the determining, by the network device, K antenna ports in the N antenna ports based on the first antenna port combination mode set includes: determining, by the network device, a first antenna port combination mode in the S antenna port combination modes, and determining K antenna ports in the first antenna port combination mode as the K antenna ports. The first antenna port combination mode may be any one of the S antenna port combination modes.

According to the communication method in this embodiment of this application, the N antenna ports of the terminal device correspond to the T antenna port combination modes, and optionally, information about at least two antenna port combination mode sets is stored in the network device. When the first indication information sent by the terminal device is specifically used to indicate the first antenna port combination mode set, the network device can determine, based on the first antenna port combination mode set, an antenna port corresponding to an antenna port combination mode included in the first antenna port combination mode set. According to the communication method in this embodiment of this application, the S antenna port combination modes can be determined in the N antenna ports based on the antenna port combination mode set of the antenna port in the terminal device, the K antenna ports are further determined in the S antenna combination modes, and the S antenna port combination modes of the antenna port are known to the terminal device. This facilitates determining of the K antenna ports.

With reference to the first aspect and the foregoing implementations of the first aspect, in another implementation of the first aspect, the T antenna combination modes correspond to a preset precoding matrix set, the precoding matrix set includes Q precoding matrices, the first antenna port combination mode set corresponds to a precoding matrix subset, the precoding matrix subset includes P precoding matrices, each of the P precoding matrices belongs to the Q precoding matrices, P and Q are positive integers, and P is less than or equal to Q; and the determining, by the network device, K antenna ports in the N antenna ports based on the first antenna port combination mode set includes: determining, by the network device, a first precoding matrix in the precoding matrix subset, and determining K antenna ports corresponding to the first precoding matrix as the K antenna ports. The first precoding matrix may be any precoding matrix in the precoding matrix subset.

According to the communication method in this embodiment of this application, the preset precoding matrix set is known to the network device, and each precoding matrix in the precoding matrix set corresponds to one antenna port combination mode. In this case, when the first indication information indicates the first antenna port combination mode set, a corresponding antenna port combination mode can be determined based on the first antenna port combination mode set, so that a precoding matrix corresponding to the antenna port combination mode can be determined. In this case, the network device indicates the precoding matrix by using the second indication information, and the indicated precoding matrix belongs to the precoding matrix subset that is determined by the first antenna port combination mode set. The terminal device may determine the antenna port combination mode based on the indicated precoding matrix, and determine the foregoing K antenna ports. In this indication manner, indication of the precoding matrix is combined with indication of the K antenna ports, and this has an advantage of flexible indication. In addition, compared with a method for separately indicating the indication of the precoding matrix and the indication of the K antenna port indication, and this has an effect of saving bits, and further reduces signaling overheads.

With reference to the first aspect and the foregoing implementations of the first aspect, in another implementation of the first aspect, the second indication information is specifically used to indicate an index of the first precoding matrix in the precoding matrix subset.

According to the communication method in this embodiment of this application, after determining the K antenna ports based on the first indication information sent by the terminal device, the network device may send the second indication information to indicate the K antenna ports. Because the terminal device already knows the S antenna port combination modes, and the precoding matrix subset corresponding to the S antenna port combination modes, the second indication information sent by the network device specifically needs to indicate only the index of the first precoding matrix corresponding to the K antenna ports in the precoding matrix subset, so that information consumption of the second indication information can be reduced.

With reference to the first aspect and the foregoing implementations of the first aspect, in another implementation of the first aspect, the precoding matrix is a matrix in which a quantity of rows corresponds to the N antenna ports, a quantity of columns corresponds to a quantity of layers of transmitted data, and a quantity of non-zero elements in each column of elements is X, and X is an integer greater than or equal to 1, and less than or equal to M.

According to the communication method in this embodiment of this application, the quantity of rows in the precoding matrix is determined based on a total quantity of antenna ports configured for the terminal device, and the quantity of columns in the precoding matrix is determined based on a quantity of layers of pre-sent uplink data. The quantity of non-zero elements in each column of elements and locations of the non-zero elements are related to an antenna port combination mode supported by the terminal device.

With reference to the first aspect and the foregoing implementations of the first aspect, in another implementation of the first aspect, when $N=4$ and $M=2$, the precoding matrix set includes all or some of precoding matrices in the following table:

| TPMI | 0 | 1 | 2 | 3 | 4 | 5 | 6 | 7 |
|---|---|---|---|---|---|---|---|---|
| Precoding matrix (quantity of layers of transmitted data = 1) | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ |
| TPMI | 8 | 9 | 10 | 11 | 12 | 13 | 14 | 15 |
| Precoding matrix (quantity layers of transmitted data = 1) | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\1\\0\\0\end{bmatrix}$ | $\frac{1}{2}\begin{bmatrix}1\\-1\\0\\0\end{bmatrix}$ | $\frac{1}{2}\begin{bmatrix}1\\j\\0\\0\end{bmatrix}$ | $\frac{1}{2}\begin{bmatrix}1\\-j\\0\\0\end{bmatrix}$ |
| TPMI | 16 | 17 | 18 | 19 | 20 | 21 | 22 | 23 |
| Precoding matrix (quantity of layers of transmitted data = 1) | $\frac{1}{2}\begin{bmatrix}1\\0\\0\\1\end{bmatrix}$ | $\frac{1}{2}\begin{bmatrix}1\\0\\0\\-1\end{bmatrix}$ | $\frac{1}{2}\begin{bmatrix}1\\0\\0\\j\end{bmatrix}$ | $\frac{1}{2}\begin{bmatrix}1\\0\\0\\-j\end{bmatrix}$ | $\frac{1}{2}\begin{bmatrix}0\\1\\1\\0\end{bmatrix}$ | $\frac{1}{2}\begin{bmatrix}0\\1\\-1\\0\end{bmatrix}$ | $\frac{1}{2}\begin{bmatrix}0\\1\\j\\0\end{bmatrix}$ | $\frac{1}{2}\begin{bmatrix}0\\1\\-j\\0\end{bmatrix}$ |
| TPMI | 24 | 25 | 26 | 27 | | | | |
| Precoding matrix (quantity of layers of transmitted data = 1) | $\frac{1}{2}\begin{bmatrix}0\\0\\1\\1\end{bmatrix}$ | $\frac{1}{2}\begin{bmatrix}0\\0\\1\\-1\end{bmatrix}$ | $\frac{1}{2}\begin{bmatrix}0\\0\\1\\j\end{bmatrix}$ | $\frac{1}{2}\begin{bmatrix}0\\0\\1\\-j\end{bmatrix}$ | | | | | where the index TPMI of the codebook is used to indicate different precoding matrices in the precoding matrix set, and the quantity of layers of the transmitted data is equal to 1.

According to the communication method in this embodiment of this application, specifically, when four antenna ports are configured for the terminal device and the terminal device supports simultaneous uplink transmission over a maximum of two antenna ports, the precoding matrix set stored in the terminal device includes all or some of the matrices in the foregoing table. A quantity of rows of the matrix being 4 corresponds to the total quantity of antenna ports, a quantity of columns of the matrix being 1 corresponds to the quantity of layers of the transmitted data, and elements in each column in the matrix include one or two non-zero elements.

With reference to the first aspect and the foregoing implementations of the first aspect, in another implementation of the first aspect, when N=4 and M=2, the precoding matrix set includes all or some of precoding matrices in the following table:

| TPMI | 0 | 1 | 2 | 3 | 4 | 5 |
|---|---|---|---|---|---|---|
| Precoding matrix (quantity of layers of transmitted data = 2) | $\frac{1}{2}\begin{bmatrix} 0 & 0 \\ 1 & 0 \\ 0 & 0 \\ 0 & 1 \end{bmatrix}$ | $\frac{1}{2}\begin{bmatrix} 1 & 0 \\ 0 & 0 \\ 0 & 1 \\ 0 & 0 \end{bmatrix}$ | $\frac{1}{2}\begin{bmatrix} 1 & 0 \\ 0 & 1 \\ 0 & 0 \\ 0 & 0 \end{bmatrix}$ | $\frac{1}{2}\begin{bmatrix} 1 & 0 \\ 0 & 0 \\ 0 & 0 \\ 0 & 1 \end{bmatrix}$ | $\frac{1}{2}\begin{bmatrix} 0 & 0 \\ 1 & 0 \\ 0 & 1 \\ 0 & 0 \end{bmatrix}$ | $\frac{1}{2}\begin{bmatrix} 0 & 0 \\ 1 & 0 \\ 1 & 0 \\ 0 & 1 \end{bmatrix}$ | where the index TPMI of the precoding matrix is used to indicate different precoding matrices in the precoding matrix set, and the quantity of layers of the transmitted data is equal to 2.

According to the communication method in this embodiment of this application, specifically, when four antenna ports are configured for the terminal device and the terminal device supports simultaneous uplink transmission over two antenna ports, the precoding matrix set stored in the terminal device includes all or some of the matrices in the foregoing table. A quantity of rows of the matrix being 4 corresponds to the total quantity of antenna ports, a quantity of columns of the matrix being 2 corresponds to the quantity of layers of the transmitted data, and elements in each column in the matrix include one non-zero element.

With reference to the first aspect and the foregoing implementations of the first aspect, the method further includes: receiving, by the network device, a sounding reference signal SRS that is sent by the terminal device through the N antenna ports; and determining, by the network device based on the SRS, the K antenna ports in the N antenna ports.

According to the communication method in this embodiment of this application, that the network device determines the K antenna ports in the N antenna ports based on the first indication information may be based on the sounding reference signal SRS sent by the terminal device on each antenna port, so that an antenna port with relatively good quality can be selected as an antenna port for uplink transmission.

According to a second aspect, a communication method is provided. The method is performed in a communications system including a network device and a terminal device, where N antenna ports are configured for the terminal device, N is an integer greater than or equal to 2, the N antenna ports correspond to T antenna port combination modes, each antenna port combination mode corresponds to M antenna ports in the N antenna ports, at least one of M antenna ports corresponding to any two antenna port combination modes is different, each antenna port combination mode set includes at least one antenna port combination mode, and T is an integer greater than or equal to 1. The communication method includes: sending, by the terminal device, first indication information to the network device, where the first indication information is used to indicate a first antenna port combination mode set, the first antenna port combination mode set is used to determine K antenna ports in the N antenna ports, and K is an integer greater than or equal to 1, and less than or equal to M; and receiving, by the terminal device, second indication information from the network device, where the second indication information is used to indicate the K antenna ports.

According to the communication method in this embodiment of this application, the terminal device sends the first indication information, and the first indication information is used to determine the K antenna ports in the N antenna ports configured for the terminal device. In addition, the terminal device receives the second indication information from the network device to indicate the K antenna ports. Because the first indication information already indicates the first antenna port combination mode set, the network device determines the K antenna ports in the N antenna ports based on the first antenna port combination mode set. According to the communication method in this embodiment of this application, an antenna port can be dynamically selected from a plurality of antenna ports of the terminal device to transmit an uplink signal, so that the uplink signal can be sent on K optimal antennas, thereby improving uplink performance.

With reference to the second aspect, in some implementations of the second aspect, the first antenna port combination mode set includes S antenna port combination modes, and S is an integer greater than or equal to 1, and less than or equal to T; and that the first antenna port combination mode set is used to determine K antenna ports in the N antenna ports includes: determining K antenna ports in any one of the S antenna port combination modes as the K antenna ports.

According to the communication method in this embodiment of this application, the N antenna ports of the terminal device correspond to the T antenna port combination modes, and optionally, information about at least two antenna port combination mode sets is stored in the network device. When the first indication information sent by the terminal device is specifically used to indicate the first antenna port combination mode set, the network device can determine, based on the first antenna port combination mode set, an antenna port corresponding to an antenna port combination mode included in the first antenna port combination mode set. According to the communication method in this embodiment of this application, the S antenna port combination modes can be determined in the N antenna ports based on the antenna port combination mode set of the antenna port in the terminal device, the K antenna ports are further determined in the S antenna combination modes, and the S antenna port combination modes of the antenna port are known to the terminal device. This facilitates determining of the K antenna ports.

With reference to the second aspect and the foregoing implementations of the second aspect, in another implementation of the second aspect, the T antenna combination modes correspond to a preset precoding matrix set, the precoding matrix set includes Q precoding matrices, the first antenna port combination mode set corresponds to a precoding matrix subset, the precoding matrix subset includes P precoding matrices, each of the P precoding matrices belongs to the Q precoding matrices, P and Q are positive integers, and P is less than or equal to Q; and that the first antenna port combination mode set is used to determine K antenna ports in the N antenna ports includes: determining a first precoding matrix in the precoding matrix subset, and determining K antenna ports corresponding to the first precoding matrix as the K antenna ports. According to the communication method in this embodiment of this application, the preset precoding matrix set is known to the network device, and each precoding matrix in the precoding matrix set corresponds to one antenna port combination mode. In this case, when the first indication information indicates the first antenna port combination mode set, a corresponding antenna port combination mode can be determined based on the first antenna port combination mode set, so that a precoding matrix corresponding to the antenna port combination mode can be determined. In this case, the network device indicates the precoding matrix by using the second indication information, and the indicated precoding matrix belongs to the precoding matrix subset that is determined by the first antenna port combination mode set. The terminal device may determine the antenna port combination mode based on the indicated precoding matrix, and determine the foregoing K antenna ports. In this indication manner, indication of the precoding matrix is combined with indication of the K antenna ports, and this has an advantage of flexible indication. In addition, compared with a method for separately indicating the indication of the precoding matrix and the indication of the K antenna port indication, and this has an effect of saving bits, and further reduces signaling overheads.

With reference to the second aspect and the foregoing implementations of the second aspect, in another implementation of the second aspect, the second indication information is specifically used to indicate an index of the first precoding matrix in the precoding matrix subset.

According to the communication method in this embodiment of this application, after determining the K antenna ports based on the first indication information sent by the terminal device, the network device may send the second indication information to indicate the K antenna ports. Because the terminal device already knows the S antenna port combination modes, and the precoding matrix subset corresponding to the S antenna port combination modes, the second indication information sent by the network device specifically needs to indicate only the index of the first precoding matrix corresponding to the K antenna ports in the precoding matrix subset, so that information consumption of the second indication information can be reduced.

With reference to second first aspect and the foregoing implementations of the second aspect, in another implementation of the second aspect, the precoding matrix is a matrix in which a quantity of rows corresponds to the N antenna ports, a quantity of columns corresponds to a quantity of layers of transmitted data, and a quantity of non-zero elements in each column of elements is X, and X is an integer greater than or equal to 1, and less than or equal to M.

According to the communication method in this embodiment of this application, the quantity of rows in the precoding matrix is determined based on a total quantity of antenna ports configured for the terminal device, and the quantity of columns in the precoding matrix is determined based on a quantity of layers of transmitted uplink data. The quantity of non-zero elements in each column of elements and locations of the non-zero elements are related to an antenna port combination mode supported by the terminal device. This can ensure that the precoding matrix can indicate a corresponding antenna port.

With reference to the second aspect and the foregoing implementations of the second aspect, in another implementation of the second aspect, when N=4 and M=2, the precoding matrix set includes all or some of precoding matrices in the following table:

| TPMI | 0 | 1 | 2 | 3 | 4 | 5 | 6 | 7 |
|---|---|---|---|---|---|---|---|---|
| Precoding matrix (quantity of layers of transmitted data = 1) | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ |
| TPMI | 8 | 9 | 10 | 11 | 12 | 13 | 14 | 15 |
| Precoding matrix (quantity of layers of transmitted data = 1) | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\1\\0\\0\end{bmatrix}$ | $\frac{1}{2}\begin{bmatrix}1\\-1\\0\\0\end{bmatrix}$ | $\frac{1}{2}\begin{bmatrix}1\\j\\0\\0\end{bmatrix}$ | $\frac{1}{2}\begin{bmatrix}1\\-j\\0\\0\end{bmatrix}$ |
| TPMI | 16 | 17 | 18 | 19 | 20 | 21 | 22 | 23 |
| Precoding matrix (quantity of layers of transmitted data = 1) | $\frac{1}{2}\begin{bmatrix}1\\0\\0\\1\end{bmatrix}$ | $\frac{1}{2}\begin{bmatrix}1\\0\\0\\-1\end{bmatrix}$ | $\frac{1}{2}\begin{bmatrix}1\\0\\0\\j\end{bmatrix}$ | $\frac{1}{2}\begin{bmatrix}1\\0\\0\\-j\end{bmatrix}$ | $\frac{1}{2}\begin{bmatrix}0\\1\\1\\0\end{bmatrix}$ | $\frac{1}{2}\begin{bmatrix}0\\1\\-1\\0\end{bmatrix}$ | $\frac{1}{2}\begin{bmatrix}0\\1\\j\\0\end{bmatrix}$ | $\frac{1}{2}\begin{bmatrix}0\\1\\-j\\0\end{bmatrix}$ |

-continued

| TPMI | 24 | 25 | 26 | 27 |
|---|---|---|---|---|
| Precoding matrix (quantity of layers of transmitted data = 1) | $\frac{1}{2}\begin{bmatrix}0\\0\\1\\1\end{bmatrix}$ | $\frac{1}{2}\begin{bmatrix}0\\0\\1\\-1\end{bmatrix}$ | $\frac{1}{2}\begin{bmatrix}0\\0\\1\\j\end{bmatrix}$ | $\frac{1}{2}\begin{bmatrix}0\\0\\1\\-j\end{bmatrix}$ | where the index TPMI of the codebook is used to indicate different precoding matrices in the precoding matrix set, and the quantity of layers of the transmitted data is equal to 1.

According to the communication method in this embodiment of this application, specifically, when four antenna ports are configured for the terminal device and the terminal device supports simultaneous uplink transmission over a maximum of two antenna ports, the precoding matrix set stored in the terminal device includes all or some of the matrices in the foregoing table. A quantity of rows of the matrix being 4 corresponds to the total quantity of antenna ports, a quantity of columns of the matrix being 1 corresponds to the quantity of layers of the transmitted data, and elements in each column in the matrix include one or two non-zero elements.

With reference to the second aspect and the foregoing implementations of the second aspect, in another implementation of the second aspect, when N=4 and M=2, the precoding matrix set includes all or some of precoding matrices in the following table:

| TPMI | 0 | 1 | 2 | 3 | 4 | 5 |
|---|---|---|---|---|---|---|
| Precoding matrix (quantity of layers of transmitted data = 2) | $\frac{1}{2}\begin{bmatrix}0&0\\1&0\\0&0\\0&1\end{bmatrix}$ | $\frac{1}{2}\begin{bmatrix}1&0\\0&0\\0&1\\0&0\end{bmatrix}$ | $\frac{1}{2}\begin{bmatrix}1&0\\0&1\\0&0\\0&0\end{bmatrix}$ | $\frac{1}{2}\begin{bmatrix}1&0\\0&0\\0&0\\0&1\end{bmatrix}$ | $\frac{1}{2}\begin{bmatrix}0&0\\1&0\\0&1\\0&0\end{bmatrix}$ | $\frac{1}{2}\begin{bmatrix}0&0\\0&0\\1&0\\0&1\end{bmatrix}$ | where the index TPMI of the precoding matrix is used to indicate different precoding matrices in the precoding matrix set, and the quantity of layers of the transmitted data is equal to 2.

According to the communication method in this embodiment of this application, specifically, when four antenna ports are configured for the terminal device and the terminal device supports simultaneous uplink transmission over two antenna ports, the precoding matrix set stored in the terminal device includes all or some of the matrices in the foregoing table. A quantity of rows of the matrix being 4 corresponds to the total quantity of antenna ports, a quantity of columns of the matrix being 2 corresponds to the quantity of layers of the transmitted data, and elements in each column in the matrix include one non-zero element.

With reference to the second aspect and the foregoing implementations of the second aspect, in another implementation of the second aspect, the method further includes: sending, by the terminal device, a sounding reference signal SRS to the network device through the N antenna ports, where the SRS is used to determine the K antenna ports in the N antenna ports.

According to the communication method in this embodiment of this application, that the network device determines the K antenna ports in the N antenna ports based on the first indication information may be based on the sounding reference signal SRS sent by the terminal device on each antenna port, so that an antenna port with relatively good quality can be selected as an antenna port for uplink transmission.

According to a third aspect, a communications apparatus is provided. The apparatus may be configured to perform an operation of the first communications apparatus according to any one of the first aspect and the possible implementations of the first aspect. Specifically, the communications apparatus includes a corresponding component (means) configured to perform the steps or functions described in the first aspect, and the component may be the first communications apparatus in the first aspect. The steps or functions may be implemented by software, hardware, or a combination of hardware and software.

According to a fourth aspect, a communications apparatus is provided. The apparatus may be configured to perform an operation of the second communications apparatus according to any one of the second aspect and the possible implementations of the second aspect. Specifically, the apparatus may include a corresponding component (means) configured to perform the steps or functions described in the second aspect. The steps or functions may be implemented by software, hardware, or a combination of hardware and software.

According to a fifth aspect, a communications system is provided. The communications system includes a processor and a memory. The memory is configured to store a computer program. The processor is configured to invoke the computer program from the memory and run the computer program, so that the communications apparatus performs the communication method according to any one of the possible implementations of the first aspect or the possible implementations of the second aspect.

Optionally, there are one or more processors and one or more memories.

Optionally, the memory may be integrated into the processor, or the memory and the processor are separately disposed.

Optionally, the communications system further includes a transmitter (transmitter machine) and a receiver (receiver machine).

In a possible design, the communications system is provided. The communications system includes the transceiver, the processor, and the memory. The processor is configured to control the transceiver to send and receive a signal. The memory is configured to store a computer program. The processor is configured to invoke the computer program from the memory and run the computer program, so that the communications system performs the method according to any one of the first aspect or the possible implementations of the first aspect.

In another possible design, the communications system is provided. The communications system includes the transceiver, the processor, and the memory. The processor is configured to control the transceiver to send and receive a signal. The memory is configured to store a computer program. The processor is configured to invoke the computer program from the memory and run the computer program, so that the communications system performs the method according to any one of the second aspect or the possible implementations of the second aspect.

According to a sixth aspect, a system is provided. The system includes the foregoing communications apparatus.

According to a seventh aspect, a computer program product is provided. The computer program product includes a computer program (which may also be referred to as code or an instruction). When the computer program is run, a computer is enabled to perform the method according to any one of the possible implementations of the first aspect or the possible implementations of the second aspect.

According to an eighth aspect, a computer-readable medium is provided. The computer-readable medium stores a computer program (which may also be referred to as code or an instruction). When the computer program is run on a computer, the computer is enabled to perform the method according to any one of the possible implementations of the first aspect or the possible implementations of the second aspect.

According to a ninth aspect, a chip system is provided. The chip system includes a memory and a processor. The memory is configured to store a computer program. The processor is configured to invoke the computer program from the memory and run the computer program, so that a communications apparatus on which the chip system is installed performs the method according to any one of the possible implementations of the first aspect or the possible implementations of the second aspect.

According to the communication method, the communications apparatus, and the communications system in the embodiments of the present invention, the K antenna ports are determined in the N antenna ports configured for the terminal device by using the first antenna port combination mode set that is indicated by the first indication information sent by the terminal device, so that the antenna port can be dynamically selected from the plurality of antenna ports of the terminal device to transmit the uplink signal.

DESCRIPTION OF EMBODIMENTS

The following describes technical solutions of this application with reference to accompanying drawings.

It should be understood that the technical solutions in this application may be applied to various communications systems, for example, a global system for mobile communications (GSM) system, a code division multiple access (CDMA) system, a wideband code division multiple access (WCDMA) system, a general packet radio service (GPRS) system, a long term evolution (LTE) system, an advanced long term evolution (LTE-A) system, a universal mobile telecommunications system (UMTS), a next-generation communications system (for example, a fifth-generation (5G) communications system), a convergent system of a plurality of access systems, or an evolved system. The 5G system may also be referred to as a new radio access technology (NR) system.

Figure 1:
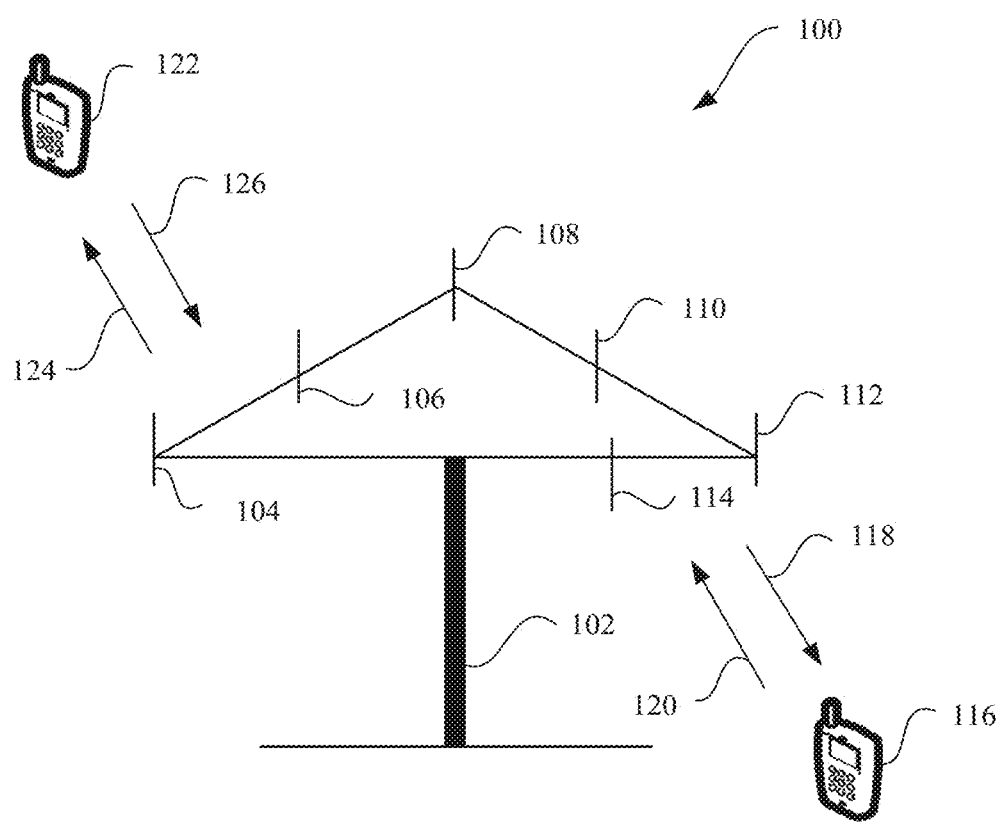
FIG. 1 is a schematic diagram of a communications system to which a communication method according to an embodiment of this application is applicable.

For ease of understanding the embodiments of this application, a communications system to which the embodiments of this application are applicable is described in detail with reference to FIG. 1. FIG. 1 is a schematic diagram of a communications system to which a data transmission method and a data transmission apparatus according to an embodiment of this application are applicable. As shown in FIG. 1, the communications system 100 includes a network device 102, and the network device 102 may include a plurality of antennas, for example, antennas 104, 106, 108, 110, 112, and 114. In addition, the network device 102 may additionally include a transmitter chain and a receiver chain. A person of ordinary skill in the art may understand that both the transmitter chain and the receiver chain may include a plurality of components (such as a processor, a modulator, a multiplexer, a demodulator, a demultiplexer, or an antenna) related to signal sending and receiving.

It should be understood that the network device may be any device having wireless sending and receiving functions or a chip that may be disposed in the device. The device includes but is not limited to a base station (for example, a NodeB, an evolved NodeB eNodeB, a network device in a fifth generation (5G) communications system (such as a transmission point (TP), a transmission reception point (TRP), a base station, or a small cell device), a network device in a future communications system, an access node in a Wi-Fi system, a wireless relay node, a wireless backhaul node, and the like.

The network device 102 may communicate with a plurality of terminal devices (for example, a terminal device 116 and a terminal device 122). The network device 102 may communicate with any quantity of terminal devices similar to the terminal device 116 or the terminal device 122.

It should be understood that the terminal device may also be referred to as user equipment (UE), an access terminal, a subscriber unit, a subscriber station, a mobile station, a mobile station, a remote station, a remote terminal, a mobile device, a user terminal, a terminal, a wireless communications device, a user agent, or a user apparatus. The terminal device in the embodiments of this application may be a mobile phone, a tablet computer (Pad), a computer with wireless sending and receiving functions, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this application. In this application, the foregoing terminal device and the chip that can be disposed in the foregoing terminal device are collectively referred to as a terminal device.

As shown in the FIG. 1, the terminal device 116 communicates with the antennas 112 and 114. The antennas 112 and 114 send information to the terminal device 116 over a forward link 118 and receive information from the terminal device 116 over a reverse link 120. In addition, the terminal device 122 communicates with the antennas 104 and 106. The antennas 104 and 106 send information to the terminal device 122 over a forward link 124 and receive information from the terminal device 122 over a reverse link 126.

The embodiments of this application may be applicable to downlink data transmission, or may be applicable to uplink data transmission, or may be applicable to device-to-device (D2D) data transmission. For example, for the downlink data transmission, a device at a transmit end is a base station, and a corresponding device at a receive end is UE. For the uplink data transmission, a device at a transmit end is UE, and a corresponding device at a receive end is a base station. For D2D data transmission, a sending device is UE, and a corresponding receiving device is also UE. This is not limited in the embodiments of this application.

For example, in a frequency division duplex (FDD) system, for example, the forward link 118 may use a frequency band different from that used by the reverse link 120, and the forward link 124 may use a frequency band different from that used by the reverse link 126.

For another example, in a time division duplex (TDD) system and a full duplex system, the forward link 118 and the reverse link 120 may use a same frequency band, and the forward link 124 and the reverse link 126 may use a same frequency band.

Each antenna (or an antenna group including a plurality of antennas) and/or each area that are/is designed for communication are/is referred to as a sector of the network device 102. For example, an antenna group may be designed to communicate with a terminal device in the sector within the coverage of the network device 102. In a process in which the network device 102 communicates with the terminal devices 116 and 122 respectively over the forward links 118 and 124, a transmit antenna of the network device 102 can improve signal-to-noise ratios of the forward links 118 and 124 through beamforming. In addition, in comparison with a manner in which the network device sends, by using a single antenna, a signal to all terminal devices served by the network device, in this case, when the network device 102 sends, through beamforming, a signal to the terminal devices 116 and 122 that are randomly distributed within related coverage, less interference is caused to a mobile device in a neighboring cell.

The network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a particular quantity of data bits to be sent, over a channel, to the wireless communications receiving apparatus. The data bits may be included in a transport block (or a plurality of transport blocks) of the data, and the transport block may be segmented to generate a plurality of code blocks.

In addition, the communications system 100 may be a public land mobile network (PLMN) network, a device-to-device (D2D) network, a machine-to-machine (M2M) network, or another network. FIG. 1 is merely a simplified schematic diagram of an example used for ease of understanding, and the network may further include another network device that is not shown in FIG. 1.

Figure 2:
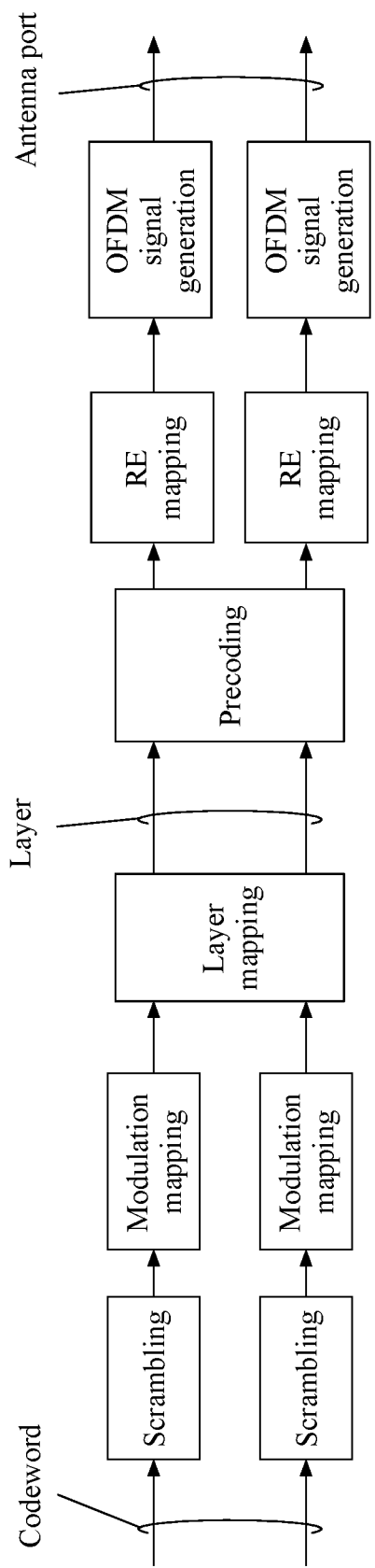
FIG. 2 is a schematic diagram of a downlink physical channel processing process used in an existing LTE system.

For ease of understanding the embodiments of this application, the following briefly describes a downlink physical channel processing process in an LTE system with reference to FIG. 2. FIG. 2 is a schematic diagram of a downlink physical channel processing process used in an existing LTE system. A physical channel may process a codeword from a higher layer, and the codeword may be a bit stream on which coding (for example, including channel coding) is performed. Scrambling is performed on the codeword, to generate a scrambled bit stream. Modulation mapping is performed on the scrambled bit stream, to obtain a modulation symbol stream. The modulation symbol stream is mapped to a plurality of layers through layer mapping. For ease of differentiation and description, in the embodiments of this application, a symbol obtained after the layer mapping may be referred to as a layer mapping spatial layer (or referred to as a layer mapping spatial stream or a layer mapping symbol stream). Precoding is performed on the layer mapping spatial layer, to obtain a plurality of precoded signal streams (or referred to as precoded symbol streams). The precoded signal streams are mapped to a plurality of REs through resource element (RE) mapping. These REs are then modulated through orthogonal frequency division multiplexing (OFDM), to generate an OFDM symbol stream. The OFDM symbol stream is then transmitted through an antenna port.

However, a person skilled in the art should understand that various signal streams mentioned in this application all belong to modulation symbol streams. It should be further understood that names such as the layer mapping spatial layer and the precoded signal stream are defined for ease of differentiation, and should not constitute any limitation to this application. This application does not exclude the possibility of replacing the foregoing names with other names in an existing protocol or a future protocol. Although the signal streams appearing in the following for a plurality of times are not described in detail, a person skilled in the art may understand, based on an execution sequence of the foregoing process, specific meanings indicated by the signal flows appearing for the plurality of times.

Based on the foregoing processing process, the network device 102 may send a downlink signal to a plurality of terminal devices by using a plurality of antennas, and the terminal device may send an uplink signal to a same network device (for example, the network device 102 shown in the figure) or different network devices (for example, the network device 102 and the network device 104 shown in the figure) by using a plurality of antennas. In a MIMO technology, interference between multi-users and interference between a plurality of signal streams of a same user may be reduced through precoding.

The precoding may be that when a channel state is already known, a to-be-transmitted signal is pre-processed at a transmit end, that is, the to-be-transmitted signal is processed by using a precoding matrix that matches a channel resource, so that the to-be-transmitted signal through the precoding adapts to a channel, in this way, the complexity of eliminating inter-channel impact at a receive end is reduced. Therefore, precoding processing is performed on a transmit signal, in this way, received signal quality (for example, a signal to interference plus noise ratio (SINR)) is improved. Therefore, a transmit end device and a plurality of receive end devices can perform transmission on a same time-frequency resource through the precoding. In other words, multi-user multiple-input multiple-output (MU-MIMO) is implemented.

It should be noted that related descriptions of the precoding are used as only an example, and are not used to limit the protection scope of the embodiments of this application. In a specific implementation process, the precoding may be performed in another manner (for example, when a channel matrix cannot be learned of, the precoding is performed by using a preset precoding matrix or in a weighted processing manner). Specific content is not described in this specification.

In a possible implementation, to obtain a precoding matrix that can adapt to a channel, the transmit end device may first perform channel measurement by sending a reference signal, to determine a relatively accurate precoding matrix for performing precoding processing on a to-be-sent signal. Specifically, the transmit end device may be a network device, the receive end device may be a terminal device, and the reference signal may be a reference signal used for downlink channel measurement, for example, a channel state information reference signal (CSI-RS). The terminal device may perform CSI measurement based on a received CSI-RS, and feedback CSI of a downlink channel to the network device. Alternatively, the transmit end device may be a terminal device, the receive end device may be a network device, and the reference signal may be a reference signal used for uplink channel measurement, for example, a sounding reference signal (SRS). The network device may perform CSI measurement based on a received SRS, to indicate CSI of an uplink channel to the terminal device. The CSI may include, for example, a precoding matrix indicator (PMI), a layer or rank indication of transmitted data, also referred to as a rank indication (RI), and a channel quality indicator (CQI).

It should be understood that the reference signal used for downlink channel measurement and the reference signal used for uplink channel measurement listed above are merely examples for description, and should not constitute any limitation to this application. For example, the reference signal used for downlink channel measurement may also be a downlink demodulation reference signal (DMRS), a tracking reference signal (TRS), a phase tracking reference signal (PTRS), and the like. The reference signal used for uplink channel measurement may also be an uplink DMRS or the like. In addition, this application does not exclude a possibility of defining another reference signal with a same or similar function in a future protocol, and this application does not exclude a possibility of defining another existing reference signal as a reference signal used for channel measurement in a future protocol.

It should be further understood that a manner in which the transmit end device determines the precoding matrix is not limited to only the foregoing manner of performing channel measurement based on the reference signal. The transmit end device may further estimate a channel by using reciprocity between an uplink channel and a downlink channel, for example, estimate CSI of the downlink channel based on channel state information (CSI) of the uplink channel. In this case, the CSI of the uplink channel may be determined based on a reference signal (for example, an SRS) sent by the terminal device.

The MIMO technology is widely used in the LTE system. When the network device has a plurality of transmit antenna ports and the terminal device has a plurality of receive antenna ports, the network device may simultaneously send a plurality of parallel data streams to the terminal device. When the terminal device has a plurality of transmit antenna ports and the network device has a plurality of receive antenna ports, the terminal device may send a plurality of parallel data streams to the network device over a physical uplink shared channel (PUSCH).

In an existing LTE protocol, the network device may have 32 transmit antenna ports, while the terminal device may have four receive antenna ports.

To support the sending of uplink data, the terminal device needs to connect a power amplifier (PA) to a corresponding antenna port. For example, if the terminal needs to support parallel data transmission over X transmit antenna ports, X power amplifiers (PA) are usually required, that is, one power amplifier is matched for each of the X antenna ports. Because construction costs of the power amplifier are relatively high, a terminal device having a capability of four transmit antenna ports is not quite common. In another alternative solution, only one or two PAs need to be configured for the terminal device, and a connection between the PA and an antenna may be dynamically changed, that is, the terminal device may be capable of dynamically adjusting an antenna port for sending an uplink signal. In this manner, the terminal may send an uplink PUSCH by using an antenna with the best channel quality, to obtain an antenna selection gain.

In the existing LTE protocol, one PA can be dynamically connected between two antenna ports in the uplink. This scenario is called 1T2R. The network device may indicate, to the terminal device by using control signaling of a physical downlink control channel (PDCCH), an antenna port used for sending the PUSCH channel.

For example, in a DCI format 0 of PDCCH downlink control information (DCI), information bits of the PDCCH use two sequences to scramble a cyclic redundancy check (CRC) sequence. Table 1 lists a transmit antenna selection mask of the terminal device.

TABLE 1

| Transmit antenna mask of the terminal device | |
|---|---|
| Transmit antenna port of the terminal device | Mask $<x_{AS,0}, x_{AS,1}, \ldots, x_{AS,15}>$ |
| Port 0 | <0, 0, 0, 0, 0, 0, 0, 0, 0, 0, 0, 0, 0, 0, 0, 0> |
| Port 1 | <0, 0, 0, 0, 0, 0, 0, 0, 0, 0, 0, 0, 0, 0, 0, 1> |

It is assumed that information bits of the PDCCH after CRC check is added are $b_0, b_1, b_2, b_3, \ldots, b_{B-1}$, where $B=A+L$, $L=16$, and A is a quantity of bits before the information bits are scrambled, that is, $b_{B-16}, \ldots,$ and $b_{B-1}$ are CRC check bits. When the network device expects a user to perform sending over an antenna port i, a CRC check bit of the network device is scrambled by using a mask $x_{AS,0}, x_{AS,1}, \ldots, x_{AS,15}$ corresponding to the antenna port i and a sequence $X_{rnti,0}, X_{rnti,1}, \ldots, X_{rnti,15}$ corresponding to a radio network temporary identifier (RNTI) of the terminal device, to finally obtain a sequence $c_0, c_1, c_2, c_3, \ldots, C_{B-1}$, that is, $c_k=b_k$, where $k=0, 1, 2, \ldots$, and B-1, and $c_k=(b_k+x_{rnti,k-A}+x_{AS,k-A})$mod 2, where $k=A$, $A+1$, $A+2, \ldots$, and $A+15$.

In the fifteenth release of LTE, it is already determined that one PA can be dynamically connected to four antenna ports, and this scenario is called 1T4R; and two PAs can be dynamically connected to four antenna ports, and this scenario is called 2T4R. Correspondingly, one or two antenna ports need to be selected from the four antenna ports as antenna ports for PUSCH transmission.

The embodiments of this application provide a communication method, applicable to a 1T4R or 2T4R scenario in which an antenna port is determined. It should be understood that the communication method provided in the embodiments of this application is still used in another scenario in which an uplink transmission antenna port is selected from a plurality of antenna ports. The 1T4R or 2T4R scenario is only an example.

With reference to FIG. 3 to FIG. 7, the following describes in detail an antenna port combination mode of one or two antenna ports from the four antenna ports and an antenna port combination mode set to which each antenna port combination mode belongs in the embodiments of this application.

Figure 3:
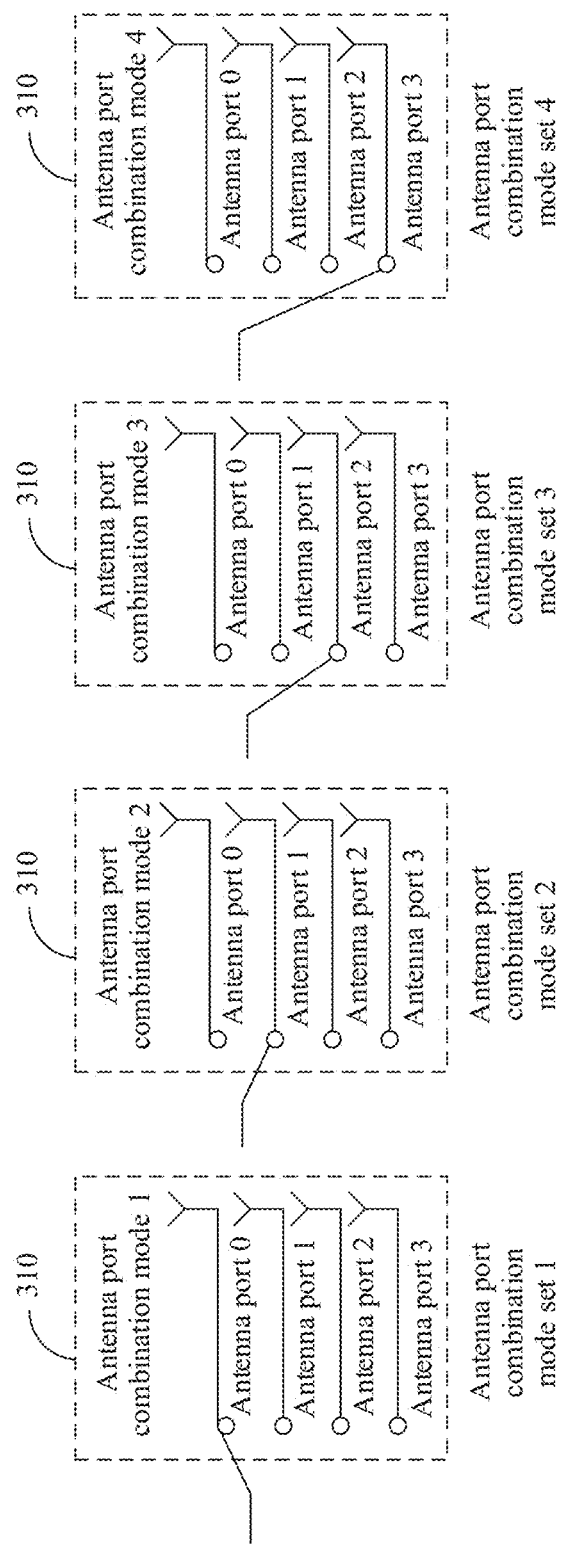
FIG. 3 is a schematic diagram of an antenna port combination mode.

FIG. 3 is a schematic diagram of an antenna port combination mode. The schematic diagram includes an antenna port 310. The following describes in detail the antenna port combination mode shown in FIG. 3.

Antenna port 310 (including an antenna port 0 to an antenna port 3 shown in FIG. 3): When an antenna port switching scenario supported by a terminal device is 1T4R, antenna port combination modes of antenna ports of the terminal device includes:

an antenna port combination mode 1 shown in FIG. 3 in which the antenna port 0 is selected as an antenna port supporting an uplink transmission signal, where the antenna port combination mode 1 belongs to an antenna port combination mode set 1;

an antenna port combination mode 2 in which the antenna port 1 is selected as an antenna port supporting an uplink transmission signal, where the antenna port combination mode 2 belongs to an antenna port combination mode set 2;

an antenna port combination mode 3 in which the antenna port 2 is selected as an antenna port supporting an uplink transmission signal, where the antenna port combination mode 3 belongs to an antenna port combination mode set 3; and an antenna port combination mode 4 in which antenna port 3 is selected as an antenna port supporting an uplink transmission signal, where the antenna port combination mode 4 belongs to an antenna port combination mode set 4.

Figure 4:
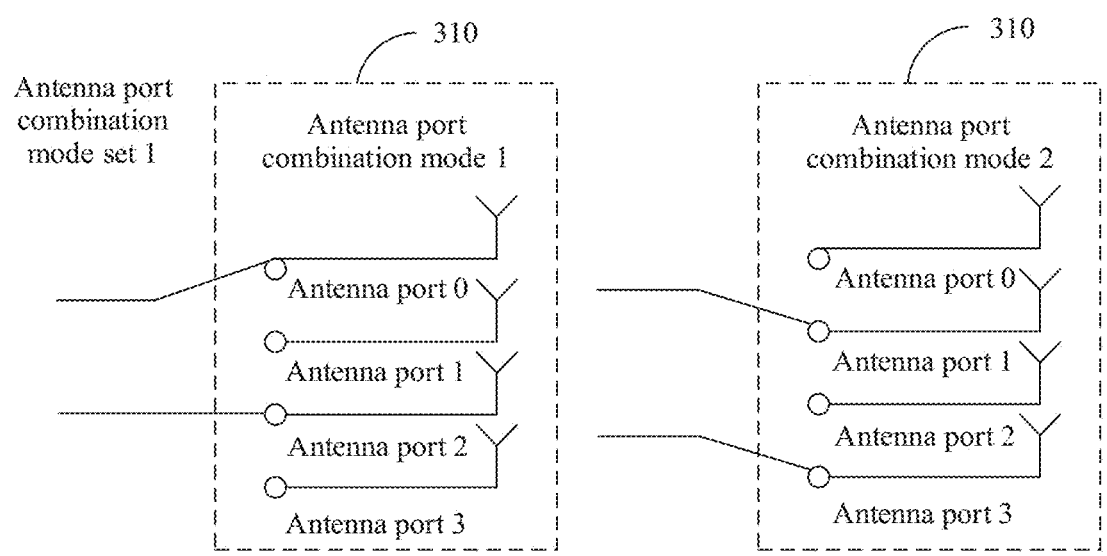
FIG. 4 is a schematic diagram of another antenna port combination mode.

FIG. 4 is a schematic diagram of another antenna port combination mode. The schematic diagram includes an antenna port 310. The following describes in detail the antenna port combination mode shown in FIG. 4.

Antenna port 310 (including an antenna port 0 to an antenna port 3 shown in FIG. 4): When a terminal device supports a 2T4R scenario, antenna port combination modes of antenna ports of the terminal device includes: an antenna port combination mode 1 shown in FIG. 4: The antenna ports (0, 2) may simultaneously send signals; and an antenna port combination mode 2: The antenna ports (1, 3) may simultaneously send signals.

The antenna port combination mode 1 and the antenna port combination mode 2 belong to an antenna port combination mode set 1.

Figure 5:
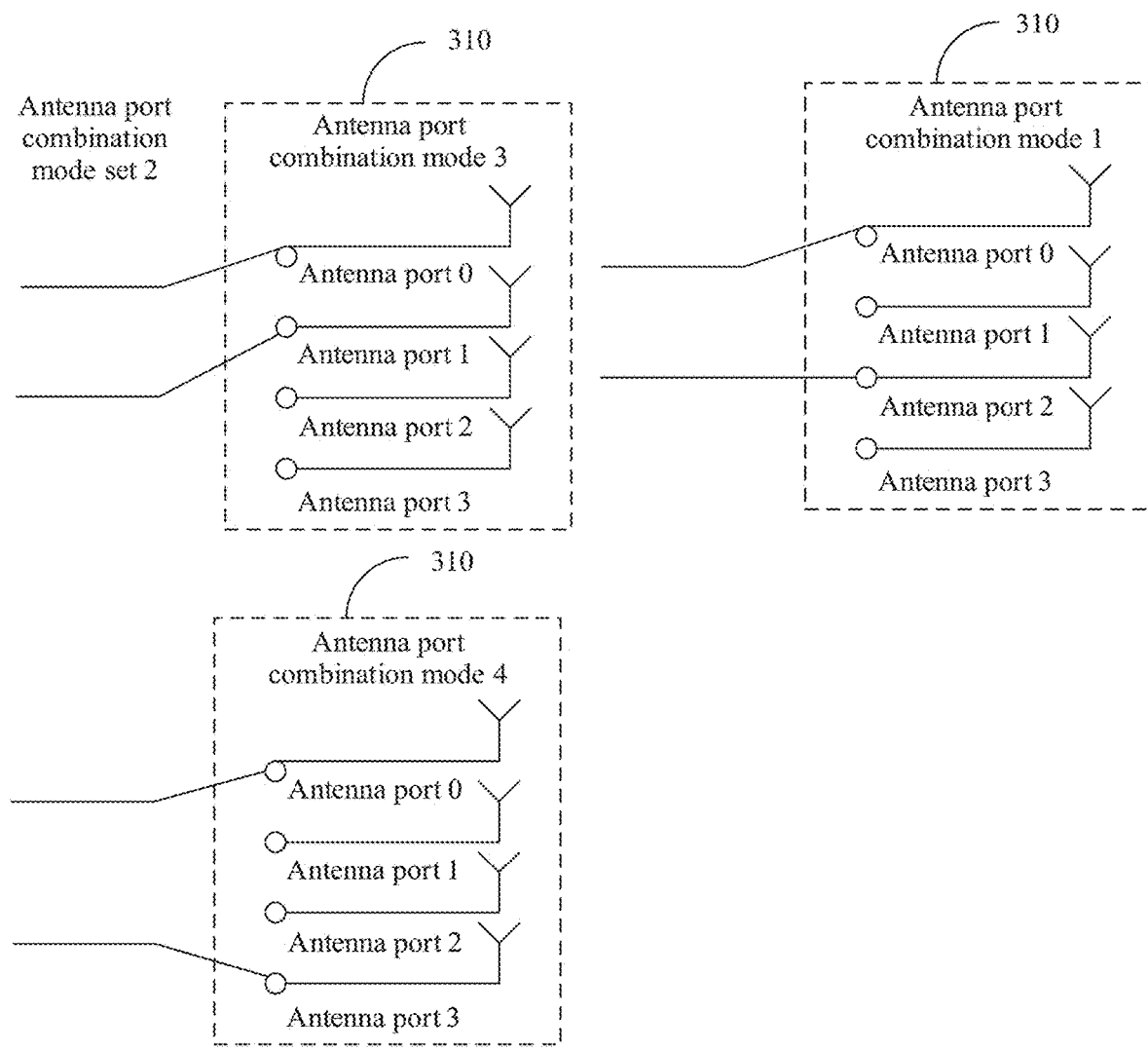
FIG. 5 is a schematic diagram of another antenna port combination mode.

FIG. 5 is a schematic diagram of another antenna port combination mode. The schematic diagram includes an antenna port 310. The following describes in detail the antenna port combination mode shown in FIG. 5.

Antenna port 310 (including an antenna port 0 to an antenna port 3 shown in FIG. 5): When a 2T4R scenario is supported, antenna port combination modes of antenna ports of a terminal device includes an antenna port combination mode set 2 shown in FIG. 5: A first PA is always connected to the antenna port 0, and another PA may be switched on the antenna (1, 2, 3). Therefore, the antenna port combination modes that can simultaneously send signals include:

an antenna port combination mode 3 in which antenna ports (0, 1) can simultaneously send signals;

an antenna port combination mode 1 in which antenna ports (0, 2) can simultaneously send signals; and an antenna port combination mode 4 in which antenna ports (0, 3) can simultaneously send signals.

Figure 6:
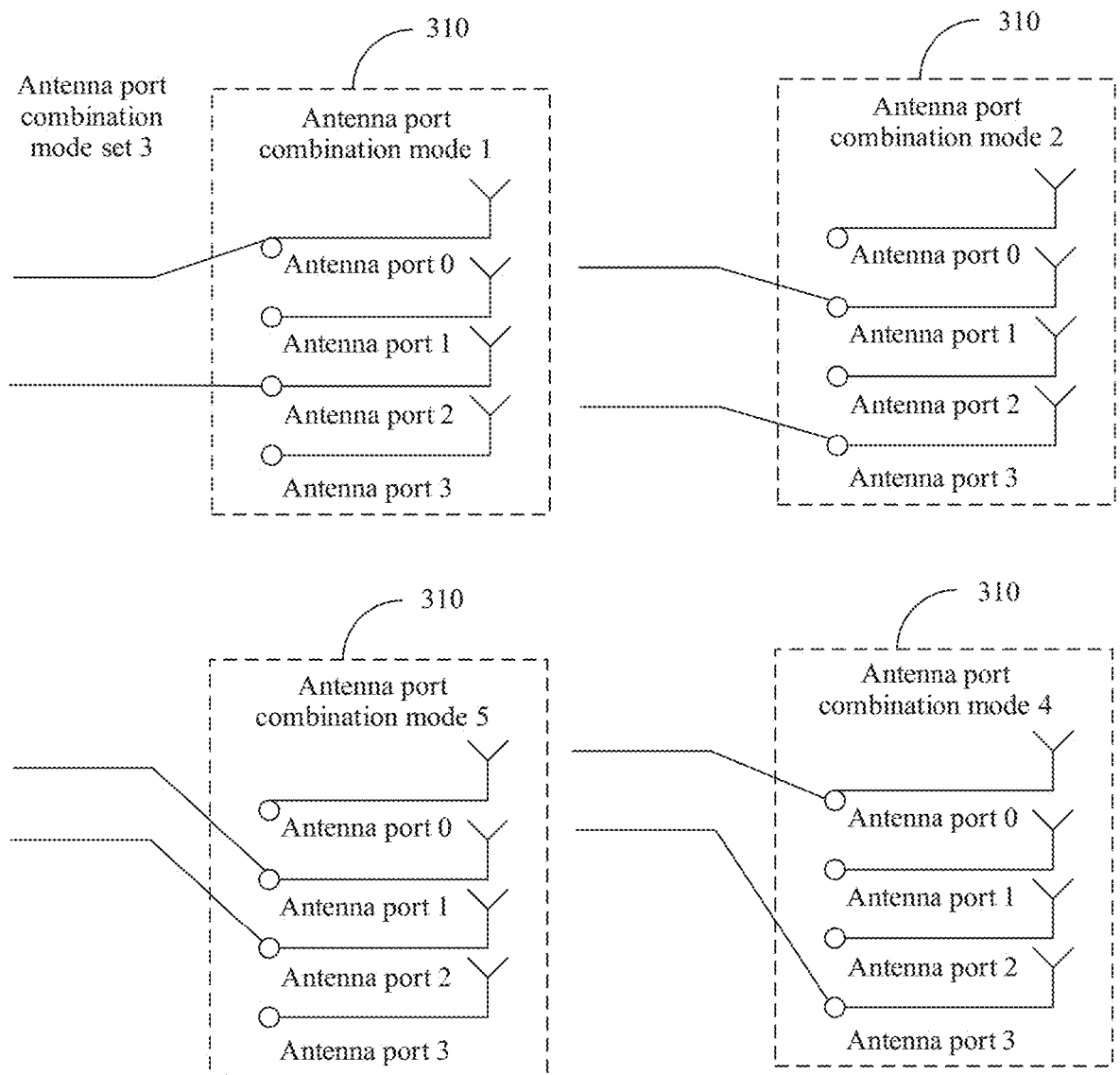
FIG. 6 is a schematic diagram of another antenna port combination mode.

FIG. 6 is a schematic diagram of another antenna port combination mode. The schematic diagram includes an antenna port 310. The following describes in detail the antenna port combination mode shown in FIG. 6.

Antenna port 310 (including an antenna port 0 to an antenna port 3 shown in FIG. 6): When a 2T4R scenario is supported, antenna port combination modes of antenna ports of a terminal device include an antenna port combination mode set 3 shown in FIG. 5: A first PA may be freely connected to the antennas 0 and 1, and a second PA may be freely connected to the antennas 2 and 3. Therefore, the antenna port combination modes that can simultaneously send signals include:

an antenna port combination mode 1 in which antenna ports (0, 2) can simultaneously send signals;

an antenna port combination mode 2 in which antenna ports (1, 3) can simultaneously send signals;

an antenna port combination mode 4 in which antenna ports (0, 3) can simultaneously send signals; and an antenna port combination mode 5 in which antenna ports (1, 2) can simultaneously send signals.

Figure 7:
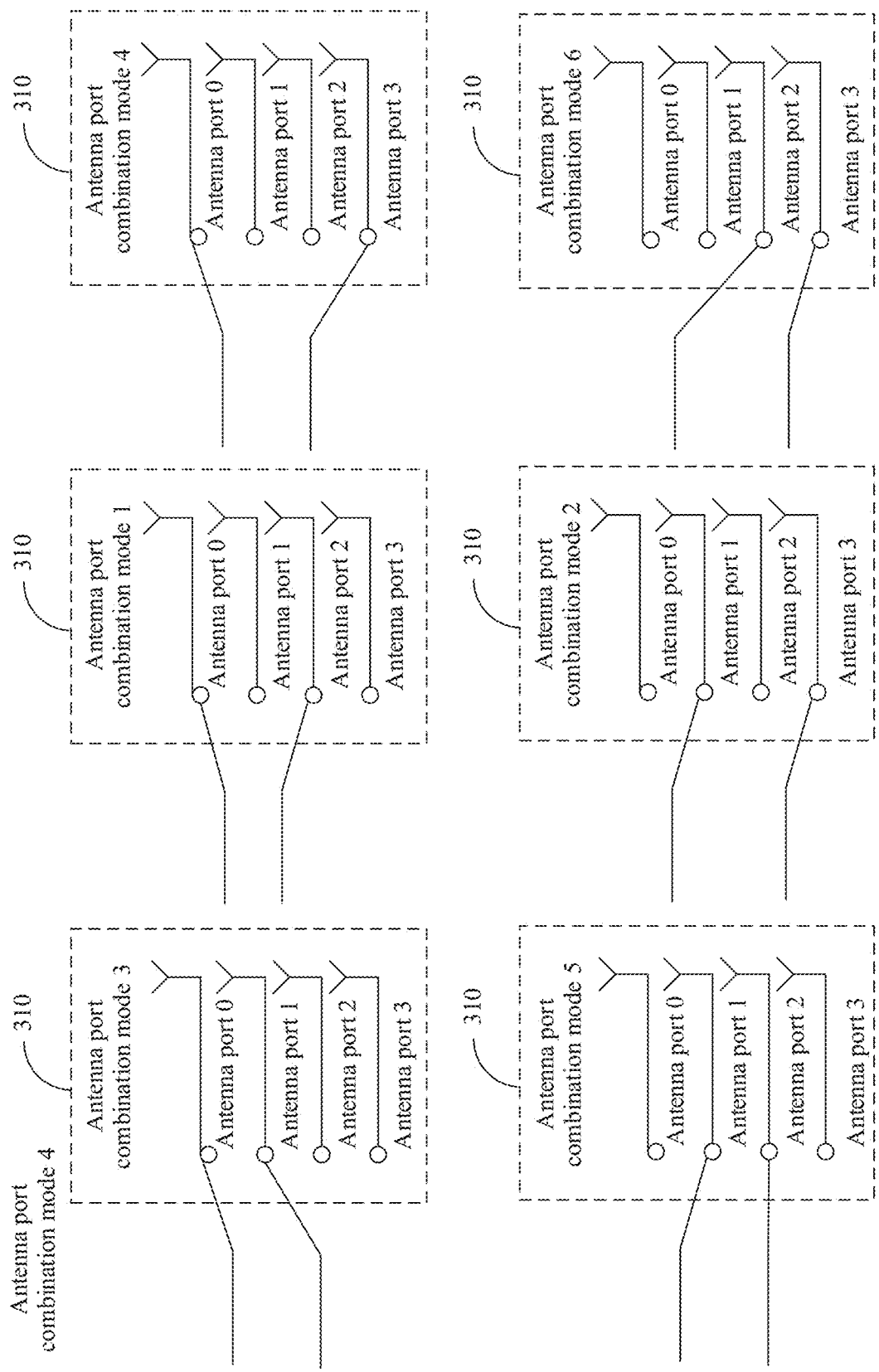
FIG. 7 is a schematic diagram of another antenna port combination mode.

FIG. 7 is a schematic diagram of another antenna port combination mode. The schematic diagram includes an antenna port 310. The following describes in detail the antenna port combination mode shown in FIG. 7.

Antenna port 310 (including an antenna port 0 to an antenna port 3 shown in FIG. 7): When a 2T4R scenario is supported, antenna port combination modes of antenna ports of a terminal device include an antenna port combination mode set 4 shown in FIG. 7: Two PAs may be connected to any antenna. Therefore, the antenna port combination modes that can simultaneously send signals include:

an antenna port combination mode 1 in which antenna ports (0, 2) can simultaneously send signals:

an antenna port combination mode 2 in which antenna ports (1, 3) can simultaneously send signals:

an antenna port combination mode 3 in which antenna ports (0, 1) can simultaneously send signals:

an antenna port combination mode 4 in which antenna ports (0, 3) can simultaneously send signals:

an antenna port combination mode 5 in which antenna ports (1, 2) can simultaneously send signals; and an antenna port combination mode 6 in which antenna ports (2, 3) can simultaneously send signals.

It should be understood that the foregoing uses the 1T4R scenario and the 2T4R scenario as examples to describe different antenna port combination modes and different antenna port combination mode sets. In another scenario, the communication method in this embodiment of this application is also applicable. Therefore, the foregoing antenna port combination modes cannot limit the protection scope of this application.

For example, in a 2T8R scenario, there are a total of $C_8^2$ antenna port combination modes, and the $C_8^2$ antenna port combination modes may also be divided into four antenna port combination mode sets (the antenna port combination mode set 1 to the antenna port combination mode set 4) based on different antenna port combination mode sets.

It should be understood that numbers of the antenna port grouping mode sets are merely examples, and may be any grouping mode set. In addition, different numbers may be configured for different grouping mode sets for differentiation.

For example, the antenna port grouping mode sets shown in FIG. 3 are numbered from 0 to 4, and the antenna port grouping mode sets shown in FIG. 4 to FIG. 7 are numbered from 5 to 8.

In the following communication method in the embodiments of this application, 1T4R and 2T4R are used as examples to describe how a network device indicates a transmit antenna of a PUSCH of the terminal device by using downlink control information.

The following describes in detail the communication method in the embodiments of this application with reference to the accompanying drawings.

It should be understood that the technical solutions of this application may be applied to a wireless communications system, for example, the communications system 100 shown in FIG. 1. The communications system may include at least one network device and at least one terminal device, and the network device and the terminal device may communicate with each other through a wireless air interface. For example, the network device in the communications system may correspond to the network device 102 or the network device 104 shown in FIG. 1, and the terminal device may correspond to the terminal device 106 shown in FIG. 1.

It should be further understood that, in the embodiments shown below, terms such as "first", "second", "third", "fourth", "fifth", "sixth", and "seventh" are merely intended to differentiate between different objects, and should not constitute any limitation to this application. For example, the terms are intended to distinguish different indication information and different indication fields.

Without loss of generality, the following describes the embodiments of this application in detail by using an interaction process between a terminal device and a network device as an example. The terminal device may be a terminal device that is in a wireless communications system and that has a wireless connection relationship with the network device. It may be understood that the network device may communicate, based on a same technical solution, with a plurality of terminal devices that are in the wireless communications system and that have the wireless connection relationship. This is not limited in this application.

Figure 8:
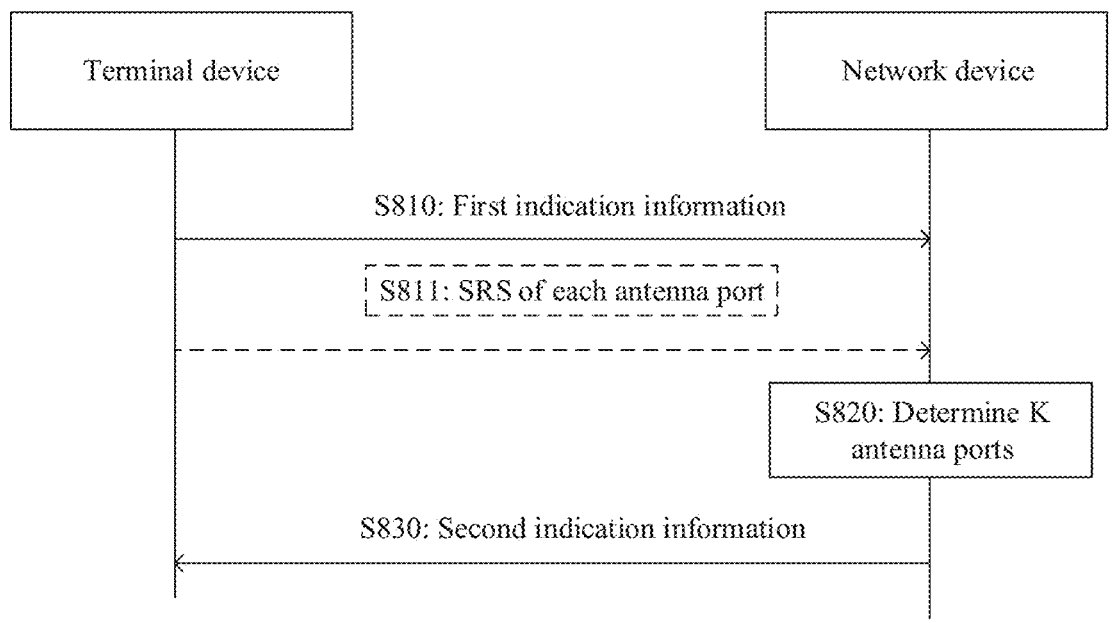
FIG. 8 is a schematic flowchart of a communication method according to an embodiment of this application.

FIG. 8 is a schematic flowchart of a communication method from a perspective of device interaction according to an embodiment of this application. As shown in FIG. 8, the method includes step S810 to step S830. The following describes the three steps in detail.

The communication method provided in this embodiment of this application is performed in a communications system including a network device and a terminal device. N antenna ports are configured for the terminal device, and N is an integer greater than or equal to 2.

S810: The terminal device sends first indication information to the network device.

The terminal device sends the first indication information to the network device, where the first indication information is used to indicate a first antenna port combination mode set.

The N antenna ports are configured for the terminal device, and N is an integer greater than or equal to 2. The N antenna ports correspond to T antenna port combination modes, each antenna port combination mode corresponds to M antenna ports in the N antenna ports, at least one of the M antenna ports corresponding to any two antenna port combination modes is different, each antenna port combination mode set includes at least one antenna port combination mode, and T is an integer greater than or equal to 1.

For example, in the foregoing 1T4R scenario, the four antenna port combination modes shown in FIG. 3 are included. Each antenna port combination mode corresponds to one of the four antenna ports, and antenna ports in the antenna port combination modes are different. Each antenna port combination mode set shown in FIG. 3 includes one antenna port combination mode.

For example, in the foregoing 2T4R scenario, the six antenna port combination modes shown in FIG. 4 to FIG. 7 are included. Each antenna port combination mode corresponds to two of the four antenna ports, and at least one antenna port in each antenna port combination mode is different.

Each antenna port combination mode set shown in FIG. 4 includes two antenna port combination modes.

Each antenna port combination mode set shown in FIG. 5 includes three antenna port combination modes.

Each antenna port combination mode set shown in FIG. 6 includes four antenna port combination modes.

Each antenna port combination mode set shown in FIG. 7 includes six antenna port combination modes.

The 2T4R scenario is used as an example, and that the first indication information is used to indicate a first antenna port combination mode set includes:

Optionally, in some embodiments, the first indication information is used to indicate that the first antenna port combination mode set is the antenna port combination mode set 1 shown in FIG. 4.

Optionally, in some other embodiments, the first indication information is used to indicate that the first antenna port combination mode set is the antenna port combination mode set 2 shown in FIG. 5.

Optionally, in some other embodiments, the first indication information is used to indicate that the first antenna port combination mode set is the antenna port combination mode set 3 shown in FIG. 6.

Optionally, in some other embodiments, the first indication information is used to indicate that the first antenna port combination mode set is the antenna port combination mode set 4 shown in FIG. 7.

The 2T4R scenario is used as an example, and that the first indication information is used to indicate a first antenna port combination mode set further includes:

Optionally, in some embodiments, when the first indication information is used to indicate that the two antenna port grouping modes are included, the first indication information indicates that the first antenna port combination mode set is the antenna port combination mode set 1 shown in FIG. 4.

Optionally, in some other embodiments, when the first indication information is used to indicate that the three antenna port grouping modes are included, the first indication information indicates that the first antenna port combination mode set is the antenna port combination mode set 2 shown in FIG. 5.

Optionally, in some other embodiments, when the first indication information is used to indicate that the four antenna port grouping modes are included, the first indication information indicates that the first antenna port combination mode set is the antenna port combination mode set 3 shown in FIG. 6.

Optionally, in some other embodiments, when the first indication information is used to indicate that the six antenna port grouping modes are included, the first indication information indicates that the first antenna port combination mode set is the antenna port combination mode set 4 shown in FIG. 7.

Optionally, in some other embodiments, the first indication information includes a quantity of antenna port combination modes in the antenna port combination mode set, and a base station device may determine, through indication of the quantity of antenna port combination modes in the antenna port combination mode set, the antenna port combination mode set that can be supported by the terminal device.

S820: The network device determines K antenna ports.

The network device determines the K antenna ports in the N antenna ports based on the first antenna port combination mode set, where K is an integer greater than or equal to 1, and less than or equal to M, which includes the following cases:

Case 1: The first antenna port combination mode set includes S antenna port combination modes, and S is an integer greater than or equal to 1, and less than or equal to T; and the network device determines a first antenna port combination mode in the S antenna port combination modes and determines K antenna ports in the first antenna port combination mode as the K antenna ports. The following uses the 1T4R and 2T4R scenarios as an example for description.

Optionally, in some embodiments, for example, an antenna port scenario supported by the terminal device is 1T4R described above. In this case, the configuration of the N antenna ports includes four forms of the antenna port combination mode set 1 to the antenna port combination mode set 4 shown in FIG. 3.

For example, the first indication information may indicate one of the four antenna ports for transmission, and a first antenna port combination mode set to which the one antenna port belongs is the antenna port combination mode set 1. In this case, the network device may determine the antenna port 0 based on the first indication information.

Optionally, in some other embodiments, for example, an antenna port scenario supported by the terminal device is the antenna port combination mode set 1 in 2T4R described above. In this case, the configuration of the N antenna ports includes two antenna port combination modes: the antenna port combination mode 1 (the antenna ports 0 and 2) and the antenna port combination mode 2 (the antenna ports 1 and 3) in the antenna port combination mode set 1 shown in FIG. 4. The first antenna port combination mode may be either of the foregoing two antenna port combination modes.

For example, the first indication information may indicate two of the four antenna ports for simultaneous transmission, and a first antenna port combination mode set to which the two antenna ports belong is the antenna port combination mode set 1. In this case, the network device may determine the antenna ports (the antenna ports 0 and 2 or the antenna ports 1 and 3) based on the first indication information. The network device then determines K antenna ports with better quality in the antenna ports 0 and 2 or the antenna ports 1 and 3.

Optionally, in some other embodiments, for example, an antenna port scenario supported by the terminal device is the antenna port combination mode 2 in 2T4R described above. In this case, the configuration of the N antenna ports includes three antenna port combination modes in the antenna port combination mode set 2 shown in FIG. 5. The first antenna port combination mode may be any one of the foregoing three antenna port combination modes.

For example, the first indication information may indicate two of the four antenna ports for simultaneous transmission, and a first antenna port combination mode set to which the two antenna ports belong is the antenna port combination mode set 2. In this case, the network device may determine the antenna ports (the antenna ports 0 and 2 or the antenna ports 0 and 1 or the antenna ports 0 and 3) based on the first indication information. The network device then determines K antenna ports with better quality in the antenna ports 0 and 2 or the antenna ports 0 and 1 or the antenna ports 0 and 3.

Optionally, in some other embodiments, for example, an antenna port scenario supported by the terminal device is the antenna port combination mode 3 in 2T4R described above. In this case, the configuration of the N antenna ports includes four antenna port combination modes in the antenna port combination mode set 3 shown in FIG. 6. The first antenna port combination mode may be any one of the foregoing four antenna port combination modes.

For example, the first indication information may indicate two of the four antenna ports for simultaneous transmission, and a first antenna port combination mode set to which the two antenna ports belong is the antenna port combination mode set 3. In this case, the network device may determine the antenna ports (the antenna ports 0 and 2, or the antenna ports 1 and 3, or the antenna ports 0 and 3, or the antenna ports 1 and 2) based on the first indication information. The network device then determines K antenna ports with better quality in the antenna ports 0 and 2, or the antenna ports 1 and 3, or the antenna ports 0 and 3, or the antenna ports 1 and 2.

Optionally, in some other embodiments, for example, an antenna port scenario supported by the terminal device is the antenna port combination mode 4 in 2T4R described above. In this case, the configuration of the N antenna ports includes six antenna port combination modes in the antenna port combination mode set 4 shown in FIG. 7. The first antenna port combination mode may be any one of the foregoing six antenna port combination modes.

For example, the first indication information may indicate two of the four antenna ports for simultaneous transmission, and a first antenna port combination mode set to which the two antenna ports belong is the antenna port combination mode set 4. In this case, the network device may determine the antenna ports (the antenna ports 0 and 2, or the antenna ports 1 and 3, or the antenna ports 0 and 3, or the antenna ports 1 and 2, or the antenna ports 2 and 3, or the antenna ports 0 and 1) based on the first indication information. The network device then determines K antenna ports with better quality in the antenna ports 0 and 2, or the antenna ports 1 and 3, or the antenna ports 0 and 3, or the antenna ports 1 and 2, or the antenna ports 2 and 3, or the antenna ports 0 and 1.

Case 2: Optionally, in some other embodiments, the first antenna port combination mode set indicates the K antenna ports in the N antenna ports, and the network device may directly determine the K antenna ports based on the first antenna port combination mode set.

Case 3: Optionally, in some embodiments, the T antenna combination modes correspond to a preset precoding matrix set, the precoding matrix set includes Q precoding matrices, the first antenna port combination mode set corresponds to a precoding matrix subset, the precoding matrix subset includes P precoding matrices, each of the P precoding matrices belongs to the Q precoding matrices, P and Q are positive integers, and P is less than or equal to Q; and the network device determines a first precoding matrix in the precoding matrix subset, and determines K antenna ports corresponding to the first precoding matrix as the K antenna ports. That is, the network device determines the first precoding matrix in the precoding matrix set based on the first antenna port combination mode set, and then may determine the K antenna ports.

First, that the first indication information separately indicates that the terminal device supports transmission over one of the four antenna ports during uplink transmission and that the terminal device supports transmission over two of the four antenna ports during uplink transmission is used as an example below. In correspondence to cases of the several antenna port combination mode sets shown in FIG. 3 to FIG. 7, how the network device determines the first precoding matrix subset corresponding to the K antenna ports is described in detail.

In this embodiment of this application, Table 2 lists a corresponding precoding matrix set corresponding to single-stream PUSCH transmission, that is, when a quantity of transport layers of data is 1.

Optionally, in some embodiments, the terminal device sends the first indication information to indicate that the terminal device supports transmission over one of the four antenna ports during uplink transmission, and an antenna port combination mode set to which the one antenna port belongs is the antenna port combination mode set 1 shown in FIG. 4. A preset mapping relationship between the first indication information and an index in the precoding matrix set is that an index in a precoding matrix set subset corresponding to the one antenna port is {8}. In this case, a precoding matrix set of the precoding matrix set subset with the index of {8} that is selected by the network device for the terminal device from Table 2 is used as a precoding matrix subset of a precoding matrix corresponding to the antenna port.

Optionally, in some embodiments, the terminal device sends the first indication information to indicate that the terminal device supports transmission over one of the four antenna ports during uplink transmission, and an antenna port combination mode set to which the one antenna port belongs is the antenna port combination mode set 2 shown in FIG. 4. A preset mapping relationship between the first indication information and an index in the precoding matrix set is that an index in a precoding matrix subset corresponding to the one antenna port is {9}. In this case, a precoding matrix set of the precoding matrix subset with the index of {9} that is selected by the network device for the terminal device from Table 2 is used as a precoding matrix subset of a precoding matrix corresponding to the antenna port.

It should be understood that when the terminal device supports transmission over one of the four antenna ports during uplink transmission, the antenna port combination mode set to which the one antenna port belongs may not be

TABLE 2

| Precoding matrix set (quantity of layers of data = 1) | | | | | | | | |
|---|---|---|---|---|---|---|---|---|
| TPMI | 0 | 1 | 2 | 3 | 4 | 5 | 6 | 7 |
| Precoding matrix (quantity of layers of transmitted data = 1) | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ |
| TPM1 | 8 | 9 | 10 | 11 | 12 | 13 | 14 | 15 |
| Precoding matrix (quantity of layers of transmitted data = 1) | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\1\\0\\0\end{bmatrix}$ | $\frac{1}{2}\begin{bmatrix}1\\-1\\0\\0\end{bmatrix}$ | $\frac{1}{2}\begin{bmatrix}1\\j\\0\\0\end{bmatrix}$ | $\frac{1}{2}\begin{bmatrix}1\\-j\\0\\0\end{bmatrix}$ |
| TPMI | 16 | 17 | 18 | 19 | 70 | 21 | 22 | 23 |
| Precoding matrix (quantity of layers of transmitted data = 1) | $\frac{1}{2}\begin{bmatrix}1\\0\\0\\1\end{bmatrix}$ | $\frac{1}{2}\begin{bmatrix}1\\0\\0\\-1\end{bmatrix}$ | $\frac{1}{2}\begin{bmatrix}1\\0\\0\\j\end{bmatrix}$ | $\frac{1}{2}\begin{bmatrix}1\\0\\0\\-j\end{bmatrix}$ | $\frac{1}{2}\begin{bmatrix}0\\1\\1\\0\end{bmatrix}$ | $\frac{1}{2}\begin{bmatrix}0\\1\\-1\\0\end{bmatrix}$ | $\frac{1}{2}\begin{bmatrix}0\\1\\j\\0\end{bmatrix}$ | $\frac{1}{2}\begin{bmatrix}0\\1\\-j\\0\end{bmatrix}$ |
| TPMI | 24 | 25 | 26 | 27 | | | | |
| Precoding matrix (quantity of layers of transmitted data = 1) | $\frac{1}{2}\begin{bmatrix}0\\0\\1\\1\end{bmatrix}$ | $\frac{1}{2}\begin{bmatrix}0\\0\\1\\-1\end{bmatrix}$ | $\frac{1}{2}\begin{bmatrix}0\\0\\1\\j\end{bmatrix}$ | $\frac{1}{2}\begin{bmatrix}0\\0\\1\\-j\end{bmatrix}$ | | | | | indicated. A preset mapping relationship between the first indication information and an index in the precoding matrix set is that indexes in a precoding matrix subset corresponding to the one antenna port are {8, 9, 10, 11}. In this case, a precoding matrix set of the precoding matrix subset with the indexes of {8, 9, 10, 11} that is selected by the network device for the terminal device from Table 2 is used as a precoding matrix subset of a precoding matrix corresponding to the antenna port. Then the network device selects, from the precoding matrix subset based on channel quality, a first precoding matrix corresponding to one antenna port with better channel quality.

Optionally, in some other embodiments, the terminal device sends the first indication information to indicate that the terminal device supports transmission over two of the four antenna ports during uplink transmission, and the two of the four antenna ports correspond to either of the two antenna port combination modes in the antenna port combination mode set 1 shown in FIG. 4. A preset mapping relationship between the first indication information and an index in the precoding matrix set is that indexes in a precoding matrix subset corresponding to the two antenna ports are {0 to 11}. In this case, a precoding matrix set of the precoding matrix subset with the indexes of {0 to 11} that is selected by the network device for the terminal device from Table 2 is used as a precoding matrix subset of a precoding matrix corresponding to the two antenna ports. Then the network device selects, from the precoding matrix subset based on channel quality, a first precoding matrix corresponding to one or two antenna ports with better channel quality.

Optionally, in some other embodiments, the terminal device sends the first indication information to indicate that the terminal device supports transmission over two of the four antenna ports during uplink transmission, and the two of the four antenna ports correspond to any one of the three antenna port combination modes in the antenna port combination mode set 2 shown in FIG. 5. A preset mapping relationship between the first indication information and an index in the precoding matrix set is that indexes in a precoding matrix subset corresponding to the two antenna ports are {0 to 3, and 8 to 19}. In this case, a precoding matrix set of the precoding matrix subset with the indexes of {0 to 3, and 8 to 19} that is selected by the network device for the terminal device from Table 2 is used as a precoding matrix subset of a precoding matrix corresponding to the antenna ports. Then the network device selects, from the precoding matrix subset based on channel quality, a first precoding matrix corresponding to one or two antenna ports with better channel quality.

Optionally, in some other embodiments, the terminal device sends the first indication information to indicate that the terminal device supports transmission over two of the four antenna ports during uplink transmission, and the two of the four antenna ports correspond to any one of the four antenna port combination modes in the antenna port combination mode set 3 shown in FIG. 6. A preset mapping relationship between the first indication information and an index in the precoding matrix set is that indexes of a precoding matrix subset corresponding to the two antenna ports are {0 to 15, and 16 to 23}. In this case, a precoding matrix set of the precoding matrix subset with the indexes of {0 to 15, and 16 to 23} that is selected by the network device for the terminal device from Table 2 is used as a precoding matrix subset of a precoding matrix corresponding to the antenna ports. Then the network device selects, from the precoding matrix subset based on channel quality, a first precoding matrix corresponding to one or two antenna ports with better channel quality.

Optionally, in some other embodiments, the terminal device sends the first indication information to indicate that the terminal device supports transmission over two of the four antenna ports during uplink transmission, and the two of the four antenna ports correspond to any one of the six antenna port combination modes in the antenna port combination mode set 4 shown in FIG. 7. A preset mapping relationship between the first indication information and an index in the precoding matrix set is that indexes in a precoding matrix subset corresponding to the two antenna ports are {0 to 27}. In this case, a precoding matrix set of the precoding matrix subset with the indexes of {0 to 27} that is selected by the network device for the terminal device from Table 2 is used as a precoding matrix subset of a precoding matrix corresponding to the antenna ports. Then the network device selects, from the precoding matrix subset based on channel quality, a first precoding matrix corresponding to one or two antenna ports with better channel quality.

It should be understood that only the precoding matrix set listed in Table 2 is used as the precoding matrix set prestored in the terminal device and the network device, and the precoding matrix subset is determined based on the first indication information. In another case, for example, the indexes in Table 2 indicate different matrices, and precoding matrix subsets obtained based on different precoding matrix sets or different first indication information are different. This is not limited in this application.

It should be understood that, in this embodiment of this application, the network device may determine one precoding matrix subset in the precoding matrix set based on the first indication information reported by the terminal device, to facilitate subsequent selection of the first precoding matrix corresponding to the antenna port by the network device.

It should be understood that, when the terminal device supports transmission over two of the four antenna ports during uplink transmission, for any corresponding antenna port combination mode set, the indexes in the determined precoding matrix subset include the indexes {8 to 11}. This is mainly for the purpose that even if the terminal device supports transmission over two of the four antenna ports during uplink transmission, if only one antenna port works properly (for example, one of the antenna ports is blocked), the network device determines, in the precoding matrix subset based on a subsequent channel quality reference signal, a precoding matrix corresponding to uplink transmission over the only one antenna port.

In this embodiment of this application, Table 3 lists a corresponding precoding matrix set corresponding to dual-stream PUSCH transmission, that is, when a quantity of layers of transmitted data is 2.

TABLE 3

| | Precoding matrix set (quantity of layers of transmitted data = 2) | | | | | |
|---|---|---|---|---|---|---|
| TPMI | 0 | 1 | 2 | 3 | 4 | 5 |
| Precoding matrix (quantity of layers of transmitted data = 2) | $\frac{1}{2}\begin{bmatrix}0&0\\1&0\\0&0\\0&1\end{bmatrix}$ | $\frac{1}{2}\begin{bmatrix}1&0\\0&0\\0&1\\0&0\end{bmatrix}$ | $\frac{1}{2}\begin{bmatrix}1&0\\0&1\\0&0\\0&0\end{bmatrix}$ | $\frac{1}{2}\begin{bmatrix}1&0\\0&0\\0&0\\0&1\end{bmatrix}$ | $\frac{1}{2}\begin{bmatrix}0&0\\1&0\\0&1\\0&0\end{bmatrix}$ | $\frac{1}{2}\begin{bmatrix}0&0\\0&0\\1&0\\0&1\end{bmatrix}$ |

Optionally, in some embodiments, the terminal device sends the first indication information to indicate that the terminal device supports transmission over two of the four antenna ports during uplink transmission, and the two of the four antenna ports correspond to either of the two antenna port combination modes in the antenna port combination mode set 1 shown in FIG. 4. A preset mapping relationship between the first indication information and an index in the precoding matrix set is that indexes in a precoding matrix subset corresponding to the two antenna ports are {0 and 1}. In this case, a precoding matrix set of the precoding matrix subset with the indexes of {0 and 1} that is selected by the network device for the terminal device from Table 3 is used as a precoding matrix subset of a precoding matrix corresponding to the antenna ports. Then the network device selects, from the precoding matrix subset based on channel quality, a first precoding matrix corresponding to two antenna ports with better channel quality.

Optionally, in some other embodiments, the terminal device sends the first indication information to indicate that the terminal device supports transmission over two of the four antenna ports during uplink transmission, and the two of the four antenna ports correspond to any one of the three antenna port combination modes in the antenna port combination mode set 2 shown in FIG. 5. A preset mapping relationship between the first indication information and an index in the precoding matrix set is that indexes of a precoding matrix subset corresponding to the two antenna ports are {2 and 4}. In this case, a precoding matrix set of the precoding matrix subset with the indexes of {2 and 4} that is selected by the network device for the terminal device from Table 3 is used as a precoding matrix subset of a precoding matrix corresponding to the antenna ports. Then the network device selects, from the precoding matrix subset based on channel quality, a first precoding matrix corresponding to two antenna ports with better channel quality.

Optionally, in some other embodiments, the terminal device sends the first indication information to indicate that the terminal device supports transmission over two of the four antenna ports during uplink transmission, and the two of the four antenna ports correspond to any one of the four antenna port combination modes in the antenna port combination mode set 3 shown in FIG. 6. A preset mapping relationship between the first indication information and an index in the precoding matrix set is that indexes in a precoding matrix subset corresponding to the two antenna ports are {0 and 1, and 3 and 4}. In this case, a precoding matrix set of the precoding matrix subset with the indexes of {0 and 1, and 3 and 4} that is selected by the network device for the terminal device from Table 3 is used as a precoding matrix subset of a precoding matrix corresponding to the antenna ports. Then the network device selects, from the precoding matrix subset based on channel quality, a first precoding matrix corresponding to two antenna ports with better channel quality.

Optionally, in some other embodiments, the terminal device sends the first indication information to indicate that the terminal device supports transmission over two of the four antenna ports during uplink transmission, and the two of the four antenna ports correspond to any one of the six antenna port combination modes in the antenna port combination mode set 4 shown in FIG. 7. A preset mapping relationship between the first indication information and an index in the precoding matrix set is that indexes in a precoding matrix subset corresponding to the two antenna ports are {0 to 5}. In this case, a precoding matrix set of the precoding matrix subset with the indexes of {0 to 5} that is selected by the network device for the terminal device from Table 3 is used as a precoding matrix subset of a precoding matrix corresponding to the antenna ports. Then the network device selects, from the precoding matrix subset based on channel quality, a first precoding matrix corresponding to two antenna ports with better channel quality.

Optionally, in some embodiments, step S811 is included: The terminal device sends a sounding reference signal SRS to the network device on each antenna port; and the network device determines the K antenna ports in the N antenna ports based on the SRS.

It should be understood that the precoding matrix sets listed in Table 2 and Table 3 may be precoding matrix sets stored in both the terminal device and the network device, or may be obtained through calculation according to a formula. The terminal device may store only the precoding matrix subset or obtain the precoding matrix subset through calculation according to the formula.

S830: The network device sends second indication information to the terminal device.

The network device sends the second indication information to the terminal device, where the second indication information is used to indicate the K antenna ports.

Optionally, in some embodiments, the second indication information includes PDCCH downlink control information (DCI).

Optionally, in some other embodiments, the second indication information is used to indicate the foregoing first precoding matrix.

Optionally, in some other embodiments, the second indication information is specifically used to indicate the index of the first precoding matrix in the precoding matrix subset.

An example in which in the 2T4R scenario, the first indication information sent by the terminal device indicates that the first antenna port combination mode set is the antenna port combination mode shown in FIG. 5 is used below to describe specific content of the second indication information sent by the network device to the terminal device: It can be learned from Table 2 and Table 3 that, when the first antenna port combination mode set is the antenna port combination mode shown in FIG. 5, the precoding matrix subset corresponding to the first antenna port combination mode set includes a form listed in Table 4.

TABLE 4

Precoding matrix subset

| Index | Information | Index | Information |
|---|---|---|---|
| 0 | RI = 1, TPMI = 0 | 0 | RI = 2, TPMI = 1 |
| 1 | RI = 1, TPMI = 1 | 1 | RI = 2, TPMI = 2 |
| ... |  | 2 | RI = 2, TPMI = 3 |
| 3 | RI = 1, TPMI = 3 |  |  |
| 4 | RI = 1, TPMI = 8 |  |  |
| ... | ... |  |  |
| 15 | RI = 1, TPMI = 19 |  |  |

It can be learned from Table 4 that the second indication information may directly indicate the index of the first precoding matrix in the precoding matrix subset. For example, the network device determines, based on the first indication information, the antenna port combination mode 1 in the antenna port combination mode set shown in FIG. 5 as an antenna port used by the terminal device for uplink transmission, determines a phase difference between antenna ports, and determines, in the precoding matrix subset, that the first precoding matrix is $$\frac{1}{2}\begin{bmatrix}1\\0\\1\\0\end{bmatrix}.$$

In this way, the second indication information may indicate an index 0000 of the first precoding matrix in the precoding matrix subset, and the terminal device may determine the antenna port for uplink transmission and the phase difference between the antenna ports based on index information.

It should be understood that the precoding matrix set in this embodiment of this application may be stored by both the terminal device and the network device, or may be obtained through calculation according to a particular formula. This is not limited in this application.

The foregoing describes in detail the communication method in the embodiments of this application with reference to FIG. 8. The following describes in detail a communications apparatus in the embodiments of this application with reference to FIG. 9 to FIG. 11.

Figure 9:
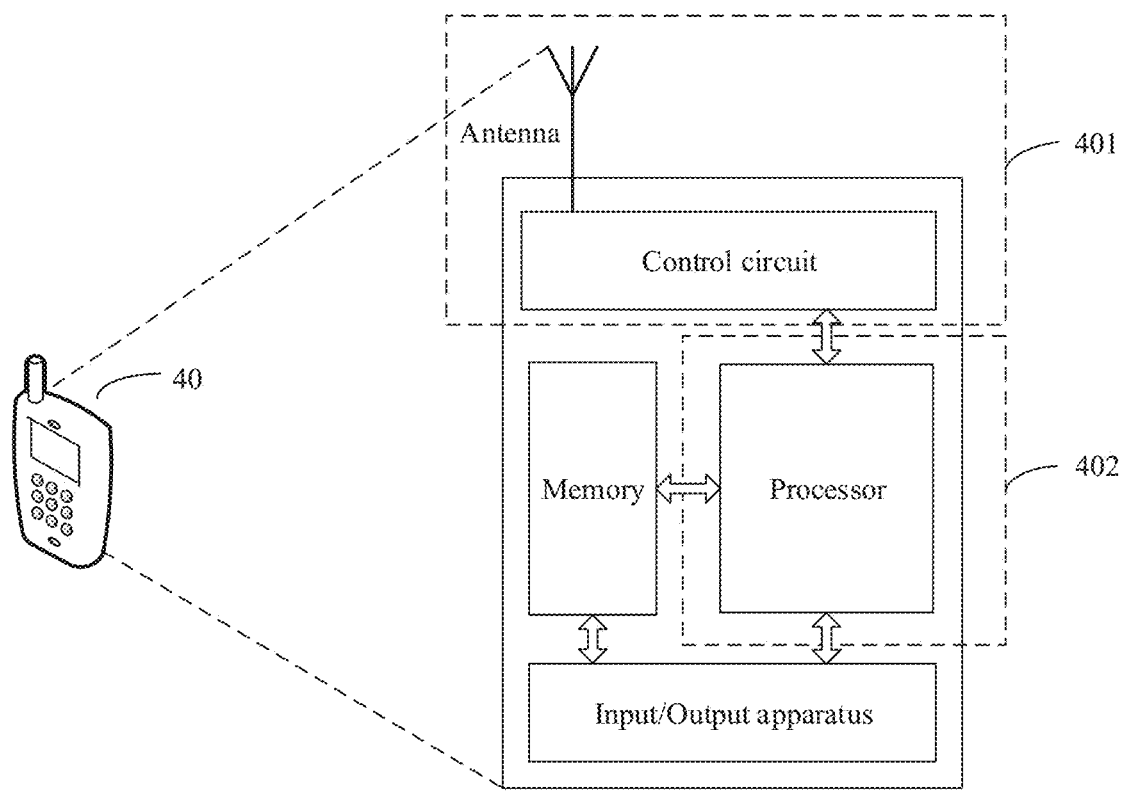
FIG. 9 is a schematic diagram of a terminal device according to an embodiment of this application.

FIG. 9 is a schematic structural diagram of a terminal device according to an embodiment of this application. The terminal device may be applicable to the system shown in FIG. 1, and perform functions of the terminal device in the foregoing method embodiments. For ease of description. FIG. 9 shows only main components of the terminal device. As shown in FIG. 9, the terminal device 40 includes a processor, a memory, a control circuit, an antenna, and an input/output apparatus. The processor is mainly configured to process a communication protocol and communication data, control the entire terminal device, execute a software program, and process data of the software program, for example, configured to support the terminal device in performing the action described in the foregoing method embodiments, for example, determine the precoding matrix based on the received second indication information, to precode a signal, send the precoded signal, and the like. The memory is mainly configured to store the software program and data, for example, store a correspondence that is between indication information and combination information and that is described in the foregoing embodiments. The control circuit is mainly configured to: perform conversion between a baseband signal and a radio frequency signal, and process the radio frequency signal. A combination of the control circuit and the antenna may also be referred to as a transceiver unit that is mainly configured to send and receive a radio frequency signal in an electromagnetic wave form. The input/output apparatus, such as a touchscreen, a display, or a keyboard, is mainly configured to: receive data input by a user, and output data to the user.

After the terminal device is powered on, the processor may read the software program in a storage unit, explain and execute an instruction of the software program, and process the data of the software program. When data needs to be sent in a wireless manner, the processor performs baseband processing on to-be-sent data and then outputs a baseband signal to a radio frequency circuit. After performing radio frequency processing on the baseband signal, the radio frequency circuit sends a radio frequency signal to the outside by using the antenna in an electromagnetic wave form. When data is sent to the terminal device, the radio frequency circuit receives a radio frequency signal by using the antenna, converts the radio frequency signal into a baseband signal, and outputs the baseband signal to the processor. The processor converts the baseband signal into data and processes the data.

A person skilled in the art may understand that for ease of description, FIG. 9 shows only one memory and one processor. In an actual terminal device, there may be a plurality of processors and a plurality of memories. The memory may also be referred to as a storage medium, a storage device, or the like, his is not limited in this embodiment of this application.

In an optional implementation, the processor may include a baseband processor and a central processing unit. The baseband processor is mainly configured to process a communication protocol and communication data. The central processing unit is mainly configured to: control the entire terminal device, execute a software program, and process data of the software program. Functions of the baseband processor and the central processing unit may be integrated into the processor in FIG. 9. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor or may be stored in a storage unit in a software program form. The processor executes the software program to implement a baseband processing function.

In this embodiment of this application, the antenna and the control circuit that have sending and receiving functions may be considered as a transceiver unit 401 of the terminal device 40. For example, the transceiver unit 401 is configured to support the terminal device in performing the receiving function and the sending function described in FIG. 8. The processor having a processing function is considered as a processing unit 402 of the terminal device 40. As shown in FIG. 9, the terminal 40 includes the transceiver unit 401 and the processing unit 402. The transceiver unit may also be referred to as a transceiver, a transceiver machine, a transceiver apparatus, or the like. Optionally, a device configured to implement a receiving function in the transceiver unit 401 may be considered as a receiving unit. A device configured to implement a sending function in the transceiver unit 401 may be considered as a sending unit. In other words, the transceiver unit 401 includes the receiving unit and the sending unit. The receiving unit may also be referred to as a receiving machine, an input port, a receiving circuit, or the like. The sending unit may be referred to as a transmitting machine, a transmitter, a transmitting circuit, or the like.

The processor 402 may be configured to execute an instruction stored in the memory, to control the transceiver unit 401 to receive a signal and/or send a signal, to complete a function of the terminal device in the foregoing method embodiments. In an implementation, a function of the transceiver unit 401 may be implemented by using a transceiver circuit or a transceiver-dedicated chip.

Figure 10:
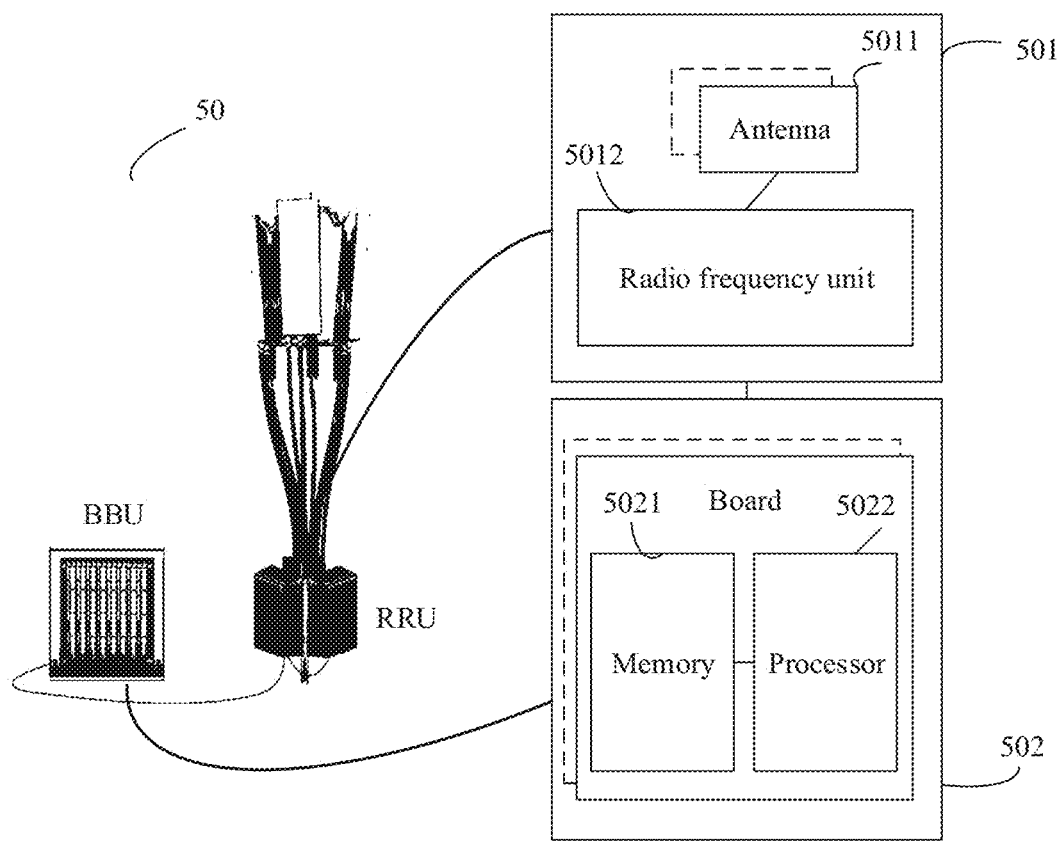
FIG. 10 is a schematic structural diagram of a network device according to an embodiment of this application.

FIG. 10 is a schematic structural diagram of a network device according to an embodiment of this application, for example, may be a schematic structural diagram of a base station. As shown in FIG. 10, the base station may be applied to the system shown in FIG. 1, to perform a function of the network device in the foregoing method embodiments. The base station 50 may include one or more radio frequency units, such as a remote radio unit (RRU) 501 and one or more baseband units (BBU) (which may also be referred to as digital units. DU) 502. The RRU 501 may be referred to as a transceiver unit, a transceiver machine, a transceiver circuit, a transceiver, or the like, and may include at least one antenna 5011 and a radio frequency unit 5012. The RRU 501 part is mainly configured to: send and receive a radio frequency signal and perform conversion between a radio frequency signal and a baseband signal, for example, configured to send the signaling message in the foregoing embodiments to a terminal device. The BBU 502 part is mainly configured to: perform baseband processing, control the base station, and so on. The RRU 501 and the BBU 502 may be physically disposed together, or may be physically separated, that is, in a distributed base station.

The BBU 502 is a control center of the base station, may also be referred to as a processing unit, and is mainly configured to complete a baseband processing function such as channel coding, multiplexing, modulation, or spreading. For example, the BBU (the processing unit) 502 may be configured to control the base station to perform an operation procedure related to the network device in the foregoing method embodiments.

In an example, the BBU 502 may include one or more boards, and a plurality of boards may jointly support a radio access network (such as an LTE network) of a single access standard, or may separately support radio access networks (such as an LTE network, a 5G network, and another network) of different access standards. The BBU 502 further includes a memory 5021 and a processor 5022. The memory 5021 is configured to store a necessary instruction and necessary data. For example, the memory 5021 stores the correspondence between the index in the precoding matrix set and the precoding matrix in the foregoing embodiments. The processor 5022 is configured to control the base station to perform a necessary action, for example, is configured to control the base station to perform an operation procedure related to the network device in the foregoing method embodiments. The memory 5021 and the processor 5022 may serve one or more boards. In other words, a memory and a processor may be independently disposed on each board. Alternatively, a plurality of boards may share a same memory and a same processor. In addition, each board may further be provided with a necessary circuit.

Figure 11:
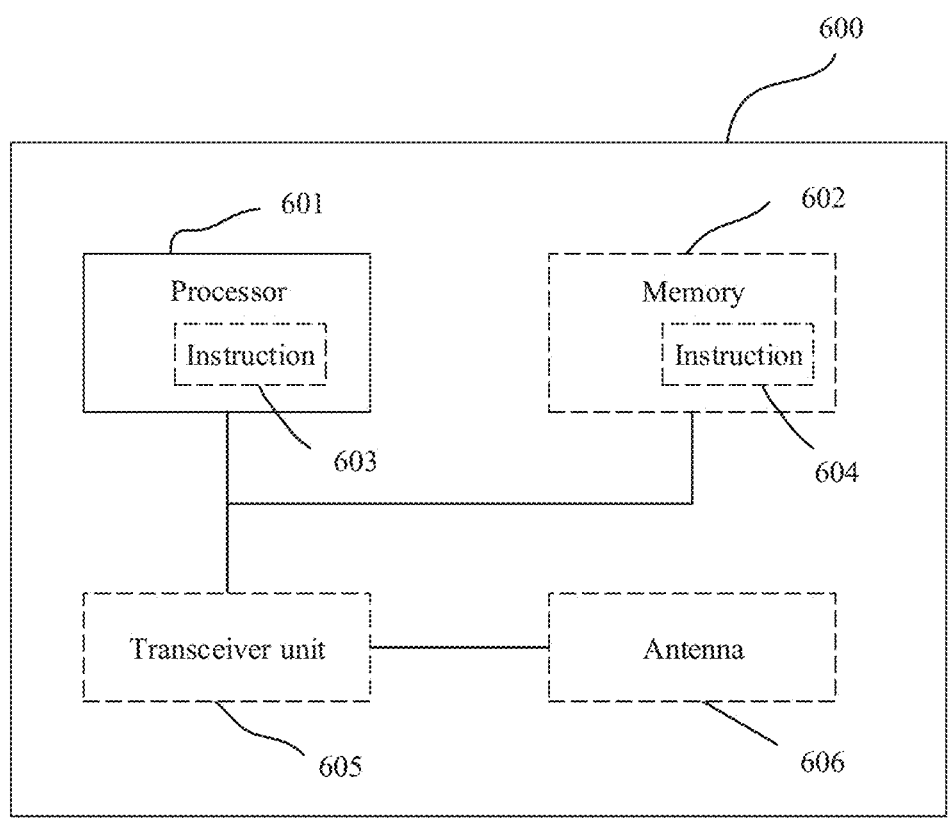
FIG. 11 is a schematic structural diagram of a communications apparatus according to an embodiment of this application.

FIG. 11 is a schematic structural diagram of a communications apparatus 600. The apparatus 600 may be configured to implement the methods described in the foregoing method embodiments. For details, refer to the descriptions in the foregoing method embodiments. The communications apparatus 600 may be a chip, a network device (for example, a base station), a terminal device, another network device, or the like.

The communications apparatus 600 includes one or more processors 601. The processing unit 601 may be a general-purpose processor, a special-purposed processor, or the like, for example, may be a baseband processor or a central processing unit. The baseband processor may be configured to process a communication protocol and communication data. The central processing unit may be configured to: control the communications apparatus (for example, a base station, a terminal, or a chip), execute a software program, and process data of the software program. The communications apparatus may include a transceiver unit that is configured to input (receive) and output (send) a signal. For example, the communications apparatus may be a chip, and the transceiver unit may be an input and/or output circuit or a communications interface of the chip. The chip may be used for a terminal, a base station, or another network device. For another example, the communications apparatus may be a terminal, a base station, or another network device, and the transceiver unit may be a transceiver, a radio frequency chip, or the like.

The communications apparatus 600 includes one or more processors 601, and the one or more processors 601 may implement the method performed by the network device or the terminal device in the embodiment shown in FIG. 8.

In a possible design, the communications apparatus 600 includes a component (means) configured to generate a precoding matrix set and a component (means) configured to send a first precoding matrix. Functions of the means for generating the precoding matrix set and the means for sending the precoding matrix set may be implemented by using one or more processors. For example, the precoding matrix set may be generated by using one or more processors, and the precoding matrix set is sent by using a transceiver, an input/output circuit, or an interface of a chip. For the precoding matrix set, refer to related descriptions in the foregoing method embodiments.

In a possible design, the communications apparatus 600 includes a component (means) configured to receive the first precoding matrix, and a component (means) configured to determine the precoding matrix and precode the signal. For the first precoding matrix and how to determine the precoding matrix, refer to related descriptions in the foregoing method embodiments. For example, the first precoding matrix may be received by using the transceiver, the input/output circuit, or the interface of the chip, and the precoded signal is sent. An antenna port for uplink transmission is determined based on second indication information by using one or more processors, and the signal is precoded.

Optionally, the processor 601 may further implement another function in addition to the method in the embodiment shown in FIG. 8.

Optionally, in a design, the processor 601 may alternatively include an instruction 603. The instruction may be run on the processor so that the communications apparatus 600 is enabled to perform the methods described in the foregoing method embodiments.

In another possible design, the communications apparatus 600 may alternatively include a circuit. The circuit may implement a function of the network device or the terminal device in the foregoing method embodiments.

In another possible design, the communications apparatus 600 may include one or more memories 602 that store the instruction 604. The instruction may be run on the processor so that the communications apparatus 600 is enabled to perform the methods described in the foregoing method embodiments. Optionally, the memory may also store data. Optionally, the processor may also store an instruction and/or data. For example, the one or more memories 602 may store a correspondence between the indication information and a category of the precoding matrix that are described in the foregoing embodiments, or a related parameter, a related table, or the like in the foregoing embodiments. The processor and the memory may be disposed separately or may be integrated together.

In another possible design, the communications apparatus 600 may further include a transceiver unit 605 and an antenna 606. The processor 601 may be referred to as a processing unit and controls the communications apparatus (the terminal or the base station). The transceiver unit 605 may be referred to as a transceiver machine, a transceiver circuit, a transceiver, or the like, and is configured to implement a transceiver function of the communications apparatus by using the antenna 606.

This application further provides a communications system, including one or more of the foregoing network devices and one or more of the foregoing terminal devices.

It should be understood that the processor in the embodiments of this application may be a central processing unit (CPU), or may further be another general-purpose processor, a digital signal processor (DSP), an application-specific integrated circuit (ASIC), a field programmable gate array (FPGA), or another programmable logical device, discrete gate or transistor logical device, discrete hardware component, or the like. The general-purpose processor may be a microprocessor, or the processor may be any conventional processor or the like.

It may further be understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example and not limitative description, many forms of random access memories (RAM) RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

Another aspect of this application provides a computer-readable storage medium. The computer-readable storage medium stores an instruction, and when the instruction is run on a computer, the computer is enabled to perform the steps performed by the network device in the method shown in FIG. 8.

Another aspect of this application provides a computer-readable storage medium. The computer-readable storage medium stores an instruction, and when the instruction is run on a computer, the computer is enabled to perform the steps performed by the terminal device in the method shown in FIG. 8.

Another aspect of this application provides a computer program product including an instruction, and when the computer program product is run on a computer, the computer is enabled to perform the steps performed by the network device in the method shown in FIG. 8.

Another aspect of this application provides a computer program product including an instruction, and when the computer program product is run on a computer, the computer is enabled to perform the steps performed by the terminal device in the method shown in FIG. 8.

All or some of the foregoing embodiments may be implemented by software, hardware, firmware, or any combination thereof. When software is used to implement the embodiments, all or some of the foregoing embodiments may be implemented in a form of a computer program product. The computer program product includes one or more computer instructions or computer programs. When the program instructions or the computer programs are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification is usually a simplified form of "and/or".

It should be understood that sequence numbers of the foregoing processes do not mean execution sequences in various embodiments of this application. The execution sequences of the processes should be determined based on functions and internal logic of the processes, and should not be construed as any limitation to the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, division into the unit is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or a part of the technical solutions may be implemented in a form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, performed in a communications system comprising a network device and a terminal device, wherein N antenna ports are configured for the terminal device, N is an integer greater than or equal to 2, the N antenna ports correspond to T antenna port combination modes, each of the T antenna port combination modes corresponds to M antenna ports in the N antenna ports, at least one of M antenna ports corresponding to any two antenna port combination modes is different, each antenna port combination mode set comprises at least one of the T antenna port combination modes, and T is an integer greater than or equal to 1, the communication method comprising:
  receiving, by the network device, first indication information from the terminal device, wherein the first indication information indicates a first antenna port combination mode set;
  determining, by the network device, K antenna ports in the N antenna ports based on the first antenna port combination mode set, wherein M is an integer greater than or equal to 1, K is an integer greater than or equal to 1, and less than or equal to M; and
  sending, by the network device, second indication information to the terminal device, wherein the second indication information indicates the K antenna ports.

2. The communication method according to claim 1, wherein the first antenna port combination mode set comprises S antenna port combination modes, and S is an integer greater than or equal to 1, and less than or equal to T, and wherein the determining, by the network device, the K antenna ports in the N antenna ports based on the first antenna port combination mode set comprises:
  determining, by the network device, a first antenna port combination mode in the S antenna port combination modes; and
  determining, by the network device, the K antenna ports in the first antenna port combination mode.

3. The communication method according to claim 1, wherein the T antenna port combination modes correspond to a preset precoding matrix set, the preset precoding matrix set comprises Q precoding matrices, the first antenna port combination mode set corresponds to a precoding matrix subset, the precoding matrix subset comprises P precoding matrices, each of the P precoding matrices belongs to the Q precoding matrices, P and Q are positive integers, and P is less than or equal to Q, and wherein
  the determining, by the network device, the K antenna ports in the N antenna ports based on the first antenna port combination mode set comprises:
  determining, by the network device, a first precoding matrix in the precoding matrix subset; and
  determining, by the network device, the K antenna ports corresponding to the first precoding matrix.

4. The communication method according to claim 3, wherein the second indication information indicates an index of the first precoding matrix in the precoding matrix subset.

5. A communication method, performed in a communications system comprising a network device and a terminal device, wherein N antenna ports are configured for the terminal device, N is an integer greater than or equal to 2, the N antenna ports correspond to T antenna port combination modes, each of the T antenna port combination modes corresponds to M antenna ports in the N antenna ports, at least one of M antenna ports corresponding to any two antenna port combination modes is different, each antenna port combination mode set comprises at least one of the T antenna port combination modes, and T is an integer greater than or equal to 1, the communication method comprising:

sending, by the terminal device, first indication information to the network device, wherein the first indication information indicates a first antenna port combination mode set, the first antenna port combination mode set determines K antenna ports in the N antenna ports, and M is an integer greater than or equal to 1, K is an integer greater than or equal to 1, and less than or equal to M; and receiving, by the terminal device, second indication information from the network device, wherein the second indication information indicates the K antenna ports.

6. The communication method according to claim 5, wherein the first antenna port combination mode set comprises S antenna port combination modes, and S is an integer greater than or equal to 1, and less than or equal to T, and wherein that the first antenna port combination mode set determines the K antenna ports in the N antenna ports comprises:

determining a first antenna port combination mode in the S antenna port combination modes; and determining the K antenna ports in the first antenna port combination mode.

7. The communication method according to claim 5, wherein the T antenna port combination modes correspond to a preset precoding matrix set, the preset precoding matrix set comprises Q precoding matrices, the first antenna port combination mode set corresponds to a precoding matrix subset, the precoding matrix subset comprises P precoding matrices, each of the P precoding matrices belongs to the Q precoding matrices, P and Q are positive integers, and P is less than or equal to Q, and wherein that the first antenna port combination mode set determines the K antenna ports in the N antenna ports comprises:

determining a first precoding matrix in the precoding matrix subset; and determining the K antenna ports corresponding to the first precoding matrix.

8. The communication method according to claim 7, wherein the second indication information indicates an index of the first precoding matrix in the precoding matrix subset.

9. The communication method according to claim 7, wherein a precoding matrix of the Q precoding matrices is a matrix in which a quantity of rows corresponds to the N antenna ports, a quantity of columns corresponds to a quantity of layers of transmitted data, and a quantity of non-zero elements in each column of elements is X, and wherein X is an integer greater than or equal to 1, and less than or equal to M.

10. The communication method according to claim 7, wherein when N=4 and M=2, the preset precoding matrix set comprises all or some of precoding matrices in a table comprising:

| TPMI | 0 | 1 | 2 | 3 | 4 | 5 | 6 | 7 |
|---|---|---|---|---|---|---|---|---|
| Precoding matrix (quantity of layers of transmitted data = 1) | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ |

| TPMI | 8 | 9 | 10 | 11 | 17 | 13 | 14 | 15 |
|---|---|---|---|---|---|---|---|---|
| Precoding matrix (quantity of layers of transmitted data = 1) | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\1\\0\\0\end{bmatrix}$ | $\frac{1}{2}\begin{bmatrix}1\\-1\\0\\0\end{bmatrix}$ | $\frac{1}{2}\begin{bmatrix}1\\j\\0\\0\end{bmatrix}$ | $\frac{1}{2}\begin{bmatrix}1\\-j\\0\\0\end{bmatrix}$ |

| TPMI | 16 | 17 | 18 | 19 | 20 | 21 | 22 | 23 |
|---|---|---|---|---|---|---|---|---|
| Precoding matrix (quantity of layers of transmitted data = 1) | $\frac{1}{2}\begin{bmatrix}1\\0\\0\\1\end{bmatrix}$ | $\frac{1}{2}\begin{bmatrix}1\\0\\0\\-1\end{bmatrix}$ | $\frac{1}{2}\begin{bmatrix}1\\0\\0\\j\end{bmatrix}$ | $\frac{1}{2}\begin{bmatrix}1\\0\\0\\-j\end{bmatrix}$ | $\frac{1}{2}\begin{bmatrix}0\\1\\1\\0\end{bmatrix}$ | $\frac{1}{2}\begin{bmatrix}0\\1\\-1\\0\end{bmatrix}$ | $\frac{1}{2}\begin{bmatrix}0\\1\\j\\0\end{bmatrix}$ | $\frac{1}{2}\begin{bmatrix}0\\1\\-j\\0\end{bmatrix}$ |

| TPMI | 24 | 25 | 26 | 27 | | | | |
|---|---|---|---|---|---|---|---|---|
| Precoding matrix (quantity of layers of transmitted data = 1) | $\frac{1}{2}\begin{bmatrix}0\\0\\1\\1\end{bmatrix}$ | $\frac{1}{2}\begin{bmatrix}0\\0\\1\\-1\end{bmatrix}$ | $\frac{1}{2}\begin{bmatrix}0\\0\\1\\j\end{bmatrix}$ | $\frac{1}{2}\begin{bmatrix}0\\0\\1\\-j\end{bmatrix}$, | | | | | and
  wherein an index TPMI of a precoding matrix of the precoding matrices in the table indicates different precoding matrices in the preset precoding matrix set, and a quantity of layers of transmitted data is equal to 1.

11. The communication method according to claim 7, wherein when N=4 and M=2, the preset precoding matrix set comprises all or some of precoding matrices in a table comprising:

| TPMI | 0 | 1 | 2 | 3 | 4 | 5 |
|---|---|---|---|---|---|---|
| Precoding matrix (quantity of layers of transmitted data = 2) | $\frac{1}{2}\begin{bmatrix}0 & 0\\1 & 0\\0 & 0\\0 & 1\end{bmatrix}$ | $\frac{1}{2}\begin{bmatrix}1 & 0\\0 & 0\\0 & 1\\0 & 0\end{bmatrix}$ | $\frac{1}{2}\begin{bmatrix}1 & 0\\0 & 1\\0 & 0\\0 & 0\end{bmatrix}$ | $\frac{1}{2}\begin{bmatrix}1 & 0\\0 & 0\\0 & 0\\0 & 1\end{bmatrix}$ | $\frac{1}{2}\begin{bmatrix}0 & 0\\1 & 0\\0 & 1\\0 & 0\end{bmatrix}$ | $\frac{1}{2}\begin{bmatrix}0 & 0\\0 & 0\\1 & 0\\0 & 1\end{bmatrix}$ | and
  wherein an index TPMI of a precoding matrix of the precoding matrices in the table is used to indicates different precoding matrices in the preset precoding matrix set, and a quantity of layers of transmitted data is equal to 2.

12. The communication method according to claim 5, wherein the method further comprises:
  sending, by the terminal device, a sounding reference signal (SRS) to the network device through the N antenna ports, wherein the SRS determines the K antenna ports in the N antenna ports.

13. A communications apparatus, comprising:
  at least one processor; and
  a non-transitory computer-readable storage medium coupled to the at least one processor and storing programming instructions for execution by the at least one processor, wherein the programming instructions instruct the at least one processor to:
  cause a transceiver to receive first indication information from a terminal device, wherein the first indication information indicates a first antenna port combination mode set, N antenna ports are configured for the terminal device, N is an integer greater than or equal to 2, the N antenna ports correspond to T antenna port combination modes, each of the T antenna port combination modes corresponds to M antenna ports in the N antenna ports, at least one of M antenna ports corresponding to any two antenna port combination modes is different, each antenna port combination mode set comprises at least one of the T antenna port combination modes, and T is an integer greater than or equal to 1;
  determine K antenna ports in the N antenna ports based on the first antenna port combination mode set, wherein M is an integer greater than or equal to 1, K is an integer greater than or equal to 1, and less than or equal to M; and
  cause the transceiver to send second indication information to the terminal device, wherein the second indication information indicates the K antenna ports.

14. The communications apparatus according to claim 13, wherein the first antenna port combination mode set comprises S antenna port combination modes, and S is an integer greater than or equal to 1, and less than or equal to T, and
  wherein the programming instructions further instruct the at least one processor to:
    determine a first antenna port combination mode in the S antenna port combination modes; and
    determine the K antenna ports in the first antenna port combination mode.

15. The communications apparatus according to claim 13, wherein the T antenna port combination modes correspond to a preset precoding matrix set, the preset precoding matrix set comprises Q precoding matrices, the first antenna port combination mode set corresponds to a precoding matrix subset, the precoding matrix subset comprises P precoding matrices, each of the P precoding matrices belongs to the Q precoding matrices, P and Q are positive integers, and P is less than or equal to Q, and wherein the programming instructions further instruct the at least one processor to:
    determine a first precoding matrix in the precoding matrix subset; and
    determine the K antenna ports corresponding to the first precoding matrix.

16. The communications apparatus according to claim 15, wherein the second indication information indicates an index of the first precoding matrix in the precoding matrix subset.

17. The communications apparatus according to claim 15, wherein a precoding matrix of the Q precoding matrices is a matrix in which a quantity of rows corresponds to the N antenna ports, a quantity of columns corresponds to a quantity of layers of transmitted data, and a quantity of non-zero elements in each column of elements is X, and wherein X is an integer greater than or equal to 1, and less than or equal to M.

18. The communications apparatus according to claim 15, wherein when N=4 and M=2, the preset precoding matrix set comprises all or some of precoding matrices in a table comprising:

| TPMI | 0 | 1 | 2 | 3 | 4 | 5 | 6 | 7 |
|---|---|---|---|---|---|---|---|---|
| Precoding matrix (quantity of layers of transmitted data = 1) | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ |

-continued

| TPMI | 8 | 9 | 10 | 11 | 17 | 13 | 14 | 15 |
|---|---|---|---|---|---|---|---|---|
| Precoding matrix (quantity of layers of transmitted data = 1) | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\1\\0\\0\end{bmatrix}$ | $\frac{1}{2}\begin{bmatrix}1\\-1\\0\\0\end{bmatrix}$ | $\frac{1}{2}\begin{bmatrix}1\\j\\0\\0\end{bmatrix}$ | $\frac{1}{2}\begin{bmatrix}1\\-j\\0\\0\end{bmatrix}$ |

| TPMI | 16 | 17 | 18 | 19 | 20 | 21 | 22 | 23 |
|---|---|---|---|---|---|---|---|---|
| Precoding matrix (quantity of layers of transmitted data = 1) | $\frac{1}{2}\begin{bmatrix}1\\0\\0\\1\end{bmatrix}$ | $\frac{1}{2}\begin{bmatrix}1\\0\\0\\-1\end{bmatrix}$ | $\frac{1}{2}\begin{bmatrix}1\\0\\0\\j\end{bmatrix}$ | $\frac{1}{2}\begin{bmatrix}1\\0\\0\\-j\end{bmatrix}$ | $\frac{1}{2}\begin{bmatrix}0\\1\\1\\0\end{bmatrix}$ | $\frac{1}{2}\begin{bmatrix}0\\1\\-1\\0\end{bmatrix}$ | $\frac{1}{2}\begin{bmatrix}0\\1\\j\\0\end{bmatrix}$ | $\frac{1}{2}\begin{bmatrix}0\\1\\-j\\0\end{bmatrix}$ |

| TPMI | 24 | 25 | 26 | 27 |
|---|---|---|---|---|
| Precoding matrix (quantity of layers of transmitted data = 1) | $\frac{1}{2}\begin{bmatrix}0\\0\\1\\1\end{bmatrix}$ | $\frac{1}{2}\begin{bmatrix}0\\0\\1\\-1\end{bmatrix}$ | $\frac{1}{2}\begin{bmatrix}0\\0\\1\\j\end{bmatrix}$ | $\frac{1}{2}\begin{bmatrix}0\\0\\1\\-j\end{bmatrix}$ | and
    wherein an index TPMI of a precoding matrix of the precoding matrices in the table indicates different precoding matrices in the preset precoding matrix set, and a quantity of layers of transmitted data is equal to 1.

19. The communications apparatus according to claim 15, wherein when N=4 and M=2, the preset precoding matrix set comprises all or some of precoding matrices in a table comprising:

| TPMI | 0 | 1 | 2 | 3 | 4 | 5 |
|---|---|---|---|---|---|---|
| Precoding matrix (quantity of layers of transmitted data = 2) | $\frac{1}{2}\begin{bmatrix}0&0\\1&0\\0&0\\0&1\end{bmatrix}$ | $\frac{1}{2}\begin{bmatrix}1&0\\0&0\\0&1\\0&0\end{bmatrix}$ | $\frac{1}{2}\begin{bmatrix}1&0\\0&1\\0&0\\0&0\end{bmatrix}$ | $\frac{1}{2}\begin{bmatrix}1&0\\0&0\\0&0\\0&1\end{bmatrix}$ | $\frac{1}{2}\begin{bmatrix}0&0\\1&0\\0&1\\0&0\end{bmatrix}$ | $\frac{1}{2}\begin{bmatrix}0&0\\0&0\\1&0\\0&1\end{bmatrix}$ | and
    wherein an index TPMI of a precoding matrix of the precoding matrices in the table indicates different precoding matrices in the preset precoding matrix set, and a quantity of layers of transmitted data is equal to 2.

20. The communications apparatus according to claim 13, wherein the programming instructions further instruct the at least one processor to:

cause the transceiver to receive a sounding reference signal (SRS) that is sent by the terminal device through the N antenna ports; and determine, based on the SRS, the K antenna ports in the N antenna ports.

* * * * *

UNITED STATES PATENT AND TRADEMARK OFFICE
CERTIFICATE OF CORRECTION

PATENT NO.        : 11,277,176 B2
APPLICATION NO.   : 17/039475
DATED             : March 15, 2022
INVENTOR(S)       : Ruiqi Zhang and Xiang Gao It is certified that error appears in the above-identified patent and that said Letters Patent is hereby corrected as shown below:

On the Title Page

Item [56], Column 2/Lines 1-2 – Delete "ULtransmission"" and insert -- transmission," --.

Item [56], Column 2/Line 2 – Delete "RSG" and insert -- TSG --.

Signed and Sealed this
Sixth Day of September, 2022

Katherine Kelly Vidal
*Director of the United States Patent and Trademark Office*